US012021434B2

(12) United States Patent
Chen et al.

(10) Patent No.: US 12,021,434 B2
(45) Date of Patent: Jun. 25, 2024

(54) ELECTRIC ASSEMBLY AND VEHICLE HAVING THE SAME

(71) Applicant: BYD COMPANY LIMITED, Shenzhen (CN)

(72) Inventors: Guangquan Chen, Shenzhen (CN); Daqi Chen, Shenzhen (CN); Chunlei Liu, Shenzhen (CN); Shuanghong Jing, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/110,267

(22) Filed: Feb. 15, 2023

(65) Prior Publication Data

US 2023/0198331 A1 Jun. 22, 2023

Related U.S. Application Data

(63) Continuation of application No. 16/969,400, filed as application No. PCT/CN2019/073413 on Jan. 28, 2019, now Pat. No. 11,735,974.

(30) Foreign Application Priority Data

Feb. 12, 2018 (CN) .......................... 201810146302.8
Feb. 12, 2018 (CN) .......................... 201820254974.6

(51) Int. Cl.
*H02K 5/12* (2006.01)
*F16H 57/04* (2010.01)
(Continued)

(52) U.S. Cl.
CPC ............... *H02K 5/12* (2013.01); *F16H 57/04* (2013.01); *H02K 5/20* (2013.01); *H02K 7/006* (2013.01); *H02K 7/116* (2013.01)

(58) Field of Classification Search
CPC ............ H02K 5/04; H02K 5/225; H02K 9/19; H02K 9/193; H02K 7/116; H02K 11/30
See application file for complete search history.

(56) References Cited

U.S. PATENT DOCUMENTS 1,651,995 A * 12/1927 Casey ....................... B27B 9/00
83/477.1
1,945,361 A * 1/1934 Ball ......................... F16H 1/46
74/421 A
(Continued)

FOREIGN PATENT DOCUMENTS

CN 201250892 Y 6/2009
CN 202274066 U 6/2012
(Continued)

OTHER PUBLICATIONS

The World Intellectual Property Organization (WIPO) International Search Report for Application No. PCT/CN2019/073413, mailed on Apr. 15, 2019, 5 pages.

*Primary Examiner* — Thomas Truong

(57) ABSTRACT

An electric assembly includes. a box assembly, a motor, and a transmission. An mounting plate is disposed in the box assembly, and the mounting plate divides a space within the box assembly into a motor holding cavity and a transmission holding cavity. The motor is disposed in the motor holding cavity. The transmission is disposed in the transmission holding cavity, and the motor is power-coupled to the transmission such that the motor and the transmission are directly integrated through the box assembly without external connection of the motor and the transmission. The mounting plate is a monolithically integral part of the box assembly.

20 Claims, 18 Drawing Sheets

(51) Int. Cl.
*H02K 5/20* (2006.01)
*H02K 7/00* (2006.01)
*H02K 7/116* (2006.01)

(56) References Cited

U.S. PATENT DOCUMENTS

| | | | |
|---|---|---|---|
| 5,245,258 A | 9/1993 | Becker et al. | |
| 6,628,026 B2 * | 9/2003 | Torii | F16H 57/029 |
| | | | 74/606 R |
| 9,525,320 B2 | 12/2016 | Vuolle-Apiala et al. | |
| 11,735,974 B2 * | 8/2023 | Chen | H02K 7/006 |
| | | | 310/52 |
| 2004/0108778 A1 | 6/2004 | Tsukamoto et al. | |
| 2004/0134693 A1 | 7/2004 | Yamagishi et al. | |
| 2004/0150271 A1 | 8/2004 | Koga et al. | |
| 2008/0073986 A1 | 3/2008 | Lee | |
| 2009/0127954 A1 * | 5/2009 | Mogi | F16H 57/0476 |
| | | | 310/90 |
| 2016/0020657 A1 | 1/2016 | Hattori et al. | |
| 2018/0226861 A1 * | 8/2018 | Palmer | H02K 5/06 |

FOREIGN PATENT DOCUMENTS

| | | |
|---|---|---|
| CN | 202278979 U | 6/2012 |
| CN | 202629021 U | 12/2012 |
| CN | 203617837 U | 5/2014 |
| CN | 104235337 A | 12/2014 |
| CN | 204013009 U | 12/2014 |
| CN | 204749857 U | 11/2015 |
| CN | 204886545 U | 12/2015 |
| CN | 103825404 B | 7/2016 |
| CN | 103795183 B | 8/2016 |
| CN | 205715465 U | 11/2016 |
| CN | 206623680 U | 11/2017 |
| CN | 107458202 A | 12/2017 |
| CN | 107650675 A | 2/2018 |
| CN | 208675006 U | 3/2019 |
| DE | 112014001112 T5 | 12/2015 |
| DE | 102015217441 A1 | 3/2016 |
| DE | 112015006071 T5 | 10/2017 |
| JP | 2009303367 A | 12/2009 |
| JP | 2016176501 A | 10/2016 |
| WO | 2007/025527 A1 | 3/2007 |
| WO | 2013/069774 A1 | 5/2013 |
| WO | 2014/125856 A1 | 5/2014 |
| WO | 2015008702 A1 | 1/2015 |
| WO | 2015/018574 A2 | 2/2015 |
| WO | 2016/006361 A1 | 1/2016 |
| WO | 2016/110519 A1 | 7/2016 |
| WO | 2017/054687 A1 | 4/2017 |

* cited by examiner

ELECTRIC ASSEMBLY AND VEHICLE HAVING THE SAME

CROSS-REFERENCE TO RELATED APPLICATIONS

This application is a continuation application of U.S. patent application Ser. No. 16/969,400, filed on Aug. 12, 2020, which is a national phase entry under 35 U.S.C. § 371 of International Application No. PCT/CN2019/073413, filed on Jan. 28, 2019, which is based on and claims priority to and benefits of Chinese Patent Applications Nos. 201810146302.8 and 201820254974.6, both filed on Feb. 12, 2018. The content of all of the above-identified applications is incorporated herein by reference in their entireties.

FIELD

This application relates to the field of vehicle manufacturing technologies and, specifically, to an electric assembly and a vehicle having the electric assembly.

BACKGROUND

A motor assembly, a transmission assembly and a controller assembly individually disposed are used in a vehicle in the related art. The motor assembly and the transmission assembly are connected together through a bolt. Box assemblies at connection locations have relatively large wall thicknesses and waste space, there are many and bulky components, the loss is high, each assembly occupies a relatively large space, the structure is insufficiently compact, mounting and maintenance are difficult, costs are relative relatively high, and the entire mass is large, which affects the endurance capability of the entire vehicle.

SUMMARY

The present disclosure aims to resolve at least one of the technical problems existing in the prior art. For this purpose, the present disclosure proposes an electric assembly, where the electric assembly has advantages such as a compact structure and a good cooling effect.

The present disclosure further provides a vehicle having the electric assembly.

To achieve the foregoing objective, according to an embodiment of a first aspect of the present disclosure, an electric assembly is proposed. The electric assembly includes: a box assembly, where an mounting plate is disposed in the box assembly, and the mounting plate divides a space within the box assembly into a motor holding cavity and a transmission holding cavity; a motor, where the motor is disposed in the motor holding cavity; a transmission, where the transmission is disposed in the transmission holding cavity, and the motor is power-coupled to the transmission such that the motor and the transmission are directly integrated through the box assembly without external connection of the motor and the transmission, where the mounting plate is a monolithically integral part of the box assembly.

Additionally, the electric assembly according to the foregoing embodiments of the present disclosure may further have the following additional technical characteristics.

According to an embodiment of the present disclosure, the transmission holding cavity is configured to contain a cooling lubricating liquid to cool the box assembly, and the cooling lubricating liquid cools the box assembly through the mounting plate.

According to an embodiment of the present disclosure, a distance between the motor and the mounting plate is less than a preset distance such that the mounting plate cools the motor.

According to an embodiment of the present disclosure, at least one of a surface of the mounting plate facing the motor and a surface of the mounting plate facing the transmission is provided with ribs.

According to an embodiment of the present disclosure, the ribs divide a space between the mounting plate and the motor into a plurality of cavities.

According to an embodiment of the present disclosure, the ribs include an annular rib extending along a circumferential direction of the motor.

According to an embodiment of the present disclosure, the ribs include a plurality of strip-shaped ribs extending along a radial direction of the motor, and the strip-shaped ribs are spaced apart along a circumferential direction of the mounting plate.

According to an embodiment of the present disclosure, heights of the strip-shaped ribs relative to the mounting plate gradually decrease from a center portion of the mounting plate to a periphery portion of the mounting plate.

According to an embodiment of the present disclosure, the box assembly includes a transmission box and a motor box, the transmission box includes a front box and a rear box, the motor box includes a motor housing and a motor backend cover, the front box and the motor housing are disposed adjacent to each other, and the mounting plate is a part of the front box or a part of the motor housing.

According to an embodiment of the present disclosure, the front box and the motor housing are integrally formed or detachably connected.

According to an embodiment of the present disclosure, the box assembly includes a transmission box and a motor box, the transmission box includes a front box and a rear box, the motor box includes a motor frontend cover, a motor housing and a motor backend cover, and the mounting plate is a part of the front box or a part of the motor frontend cover.

According to an embodiment of the present disclosure, the electric assembly further includes a controller, where the controller is mounted outside the box assembly and fixedly connected to the box assembly.

According to an embodiment of the present disclosure, the electric assembly further includes a conductive sheet, where the conductive sheet connects to the controller and the motor.

According to an embodiment of a second aspect of the present disclosure, a vehicle is proposed. The vehicle includes the electric assembly according to the embodiment of the first aspect of the present disclosure.

In the vehicle according to an embodiment of the present disclosure, the electric assembly according to the first aspect of the present disclosure is used, where the electric assembly has advantages such as a compact structure and a good cooling effect.

The additional aspects and advantages of the present disclosure will be provided in the following description, and some of the additional aspects and advantages will become clear in the following description or be understood through practice of the present disclosure.

BRIEF DESCRIPTION OF THE DRAWINGS

The foregoing and/or additional aspects and advantages of the present disclosure become more obvious and easily understood in descriptions of the embodiments with reference to the following accompanying drawings.

Figure 1:
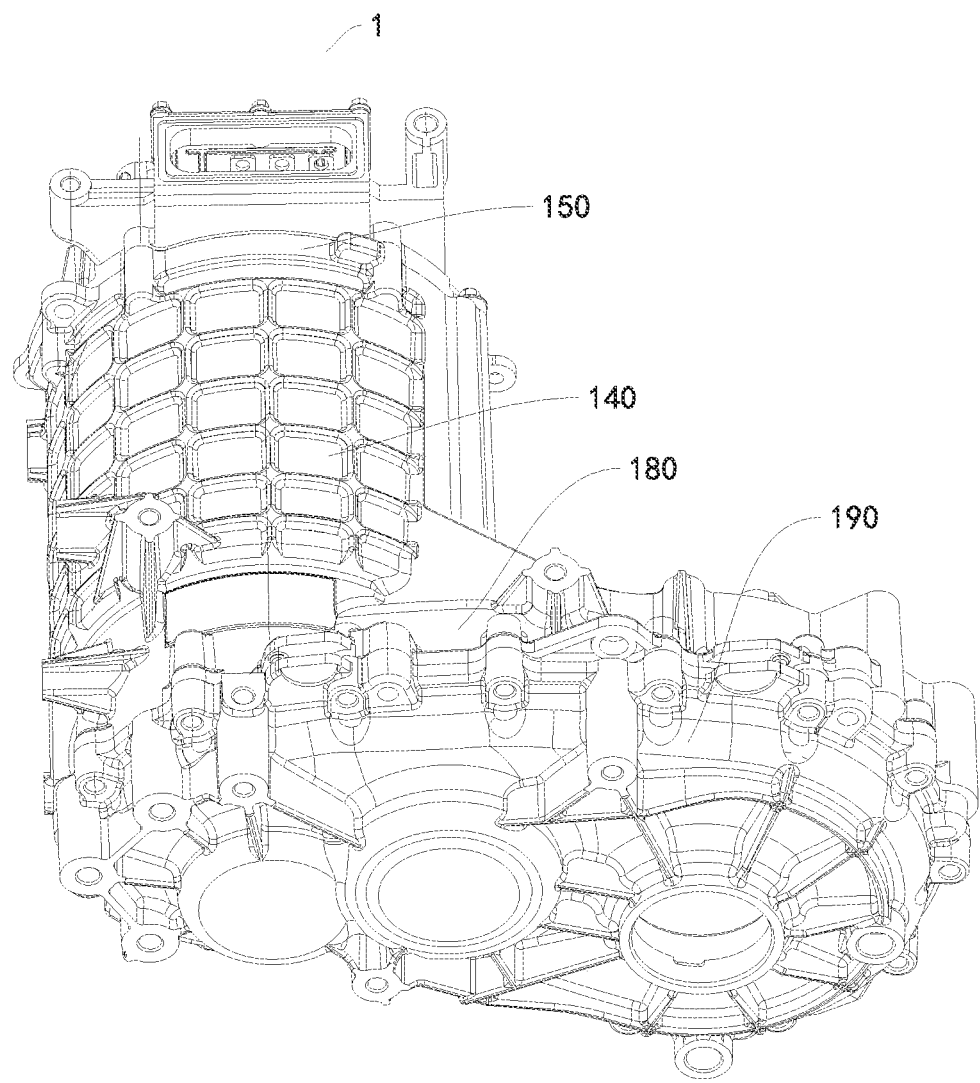
FIG. 1 is a schematic structural diagram of an electric assembly according to an embodiment of the present disclosure.

Reference numerals of the accompanying drawing: electric assembly 1; conductive member 10; conductive sheet 20; box assembly 100; transmission box 101; motor box 102; motor holding cavity 110; transmission holding cavity 120; mounting plate 160; strip-shaped rib 161; cavity 162; annular rib 163; motor 200; transmission 400; oil pump 13; mounting seat 135; spindle 134; driving gear 131; front box 180; rear box 190; motor housing 140; motor backed cover 150; motor frontend cover 170; first connection rib 181; second connection rib 182; third connection rib 183; controller 500; conductive sheet 20; positioning insert 206; motor body 203; leading wire 2031; connection device 204; supporting plate 205; leading wire 2031; motor connection end 2212; shaft via-hole 130; reinforcing rib 141; motor shaft 210; outer spline 211; main shaft 300; shaft hole 310; inner spline 311; oil baffle 320; oil storage cavity 330; seal retainer ring 340; air vent 350; first gear 410; second gear 420; third gear 430; differential assembly 440; transmission shaft 450; first bearing 510; second bearing 520; third bearing 530; fourth bearing 540; vehicle 11.

DETAILED DESCRIPTION

The following describes exemplary embodiments of the present disclosure in detail. Examples of the embodiments are shown in the accompanying drawings. The same or similar elements and the elements having same or similar functions are denoted by like reference numerals throughout the descriptions. The following embodiments described with reference to the accompanying drawings are exemplary, and are only to describe the present disclosure and cannot be construed as a limitation to the present disclosure.

An electric assembly 1 according to an embodiment of the present disclosure is described below with reference to the accompanying drawings.

As shown in FIG. 1 to FIG. 23, the electric assembly 1 according to one embodiment of the present disclosure includes a box assembly 100, a motor 200, a transmission 400 and a cooling lubricating liquid.

An mounting plate 160 is disposed in the box assembly 100, and the mounting plate 160 divides a space within the box assembly 100 into a motor holding cavity 110 and a transmission holding cavity 120 that are arranged along an axial direction of a motor shaft 210. The motor 200 is disposed in the motor holding cavity 110. The transmission 400 is disposed in the transmission holding cavity 120, and the motor 200 is power-coupled to the transmission 400. The cooling lubricating liquid fills the transmission holding cavity 120 and cools the box assembly 100.

In the electric assembly 1 according to one embodiment of the present disclosure, the motor 200 and the transmission 400 are disposed in the box assembly 100. Compared with the motor assembly in the related art in which the front box of the transmission and the frontend cover of the motor are connected, the motor 200 and the transmission 400 share a box assembly 100, to implement the integrated design of the electric assembly 1, which not only may leave out a structure in which a plurality of box assemblies 100 are disposed, but also may leave out a bolt required to connect the motor assembly and the transmission assembly, so as to simplify the structure of the electric assembly 1, reduce the part quantity of the electric assembly 1, improve the integration level of the electric assembly 1, and improve the production efficiency of the electric assembly 1.

Moreover, the motor 200 and the transmission 400 share a box assembly 100. Compared with the related art in which the motor assembly and the transmission assembly are individually disposed, space may be saved, to help shorten an axial distance of the electric assembly 1, so that the structure of the electric assembly 1 is compact and proper, thereby improving the space utilization of the electric assembly 1, and facilitating the disposition of the electric assembly 1; and facilitating mounting and repair of the electric assembly 1, and helping improve reliability and stability of the electric assembly 1.

Moreover, the motor 200 and the transmission 400 share a box assembly 100, and therefore components used for integration of the motor 200 and the transmission 400 may be reduced, thereby helping reduce the weight of the electric assembly 1. For example, when the electric assembly 1 is applied to a vehicle 11, the entire weight of the vehicle 11 may be reduced, thereby helping reduce costs of the vehicle 11, reducing the energy loss of the vehicle 11, improving the operating efficiency of the vehicle 11, and improving the endurance capability of the vehicle 11.

Moreover, the box assembly 100 is disposed, the mounting plate 160 is disposed in the box assembly 100, and clamping needs to be performed only once during assembly, to facilitate assembly and forming of the electric assembly 1, help reduce the error of the electric assembly 1, facilitate mounting and disposition of the motor 200 and the transmission 400, improve coaxiality and radial mounting accuracy of the motor 200 and the transmission 400, and help improve the operating performance of the electric assembly 1.

Further, the cooling lubricating liquid fills the transmission holding cavity 120 and the cooling lubricating liquid may cool the box assembly 100. In this way, the transmission 400 may be cooled by using the cooling lubricating liquid, to help control the temperature range of the transmission 400 and ensure the normal operating performance of the transmission 400. Because the cooling lubricating liquid may cool the box assembly 100 at the same time, the temperature range of the box assembly 100 may be controlled to make the box assembly 100 stably run within a proper temperature range, and the motor 200 in the box assembly 100 may be further cooled through the box assembly 100, thereby helping improve the entire heat dissipation performance of the electric assembly 1 and improve the operating reliability and stability of the electric assembly 1.

Because the cooling lubricating liquid may cool the box assembly 100, and compared with the cooling manner for the electric assembly in the related art, the cooling lubricating liquid not only may cool the transmission 400 but also may cool the box assembly 100, the electric assembly 1 may be fully cooled by the cooling lubricating liquid, and the cooling evenness throughout the electric assembly 1 may be improved, to enhance the cooling effect of the electric assembly 1 and improve the cooling reliability of the electric assembly 1.

Therefore, the electric assembly 1 according to one embodiment of the present disclosure has advantages such as a compact structure and a good cooling effect.

An electric assembly 1 according to an embodiment of the present disclosure is described below with reference to the accompanying drawings.

In some specific embodiments of the present disclosure, as shown in FIG. 1 to FIG. 23, the electric assembly 1 according to one embodiment of the present disclosure includes a box assembly 100, a motor 200, a transmission 400 and a cooling lubricating liquid.

Specifically, the mounting plate 160 is constructed as a part of the box assembly 100, and the cooling lubricating liquid cools the box assembly 100 through the mounting plate 160. In this way, the disposition of the mounting plate 160 is facilitated, and heat may be transferred through the mounting plate 160, to improve the entire cooling effect of the electric assembly 1. For example, the mounting plate 160 may be cooled through the cooling lubricating liquid in the transmission holding cavity 120, and the box assembly 100 transfers heat through the mounting plate 160, to further cool the motor housing 140, thereby cooling the motor 200 in the motor housing 140.

According to an embodiment of the present disclosure, the mounting plate 160 is constructed as a part of a front box 180, and because lubricating liquid in the transmission cools the front box 180, the mounting plate 160 and the box assembly 100, for example, a motor housing 140 and a transmission box 101 may also be cooled. For example, the cavities 162 are formed between the ribs of the mounting plate 160, and therefore, the air flowing through the cavities 162 is also cooled accordingly, and the motor 200 may be cooled by using the air flowing through the cavities 162, to help improve the heat dissipation performance of the electric assembly 1. In short, the lubricating liquid passing through the transmission 400 may cool the motor housing 140 and the housing of the transmission 400 at the same time.

According to another embodiment of the present disclosure, the mounting plate 160 is constructed as a part of the motor housing 140, and because lubricating liquid in the motor cools the motor housing 140, and may also cool the mounting plate 160 and transfer heat through the mounting plate 160, so that the transmission box 101 may also be cooled, thereby cooling the box assembly 100 and improving the entire cooling effect of the electric assembly 1. In short, the lubricating liquid passing through the motor 200 may also cool the motor housing 140 and the transmission 400 at the same time.

Figure 19:
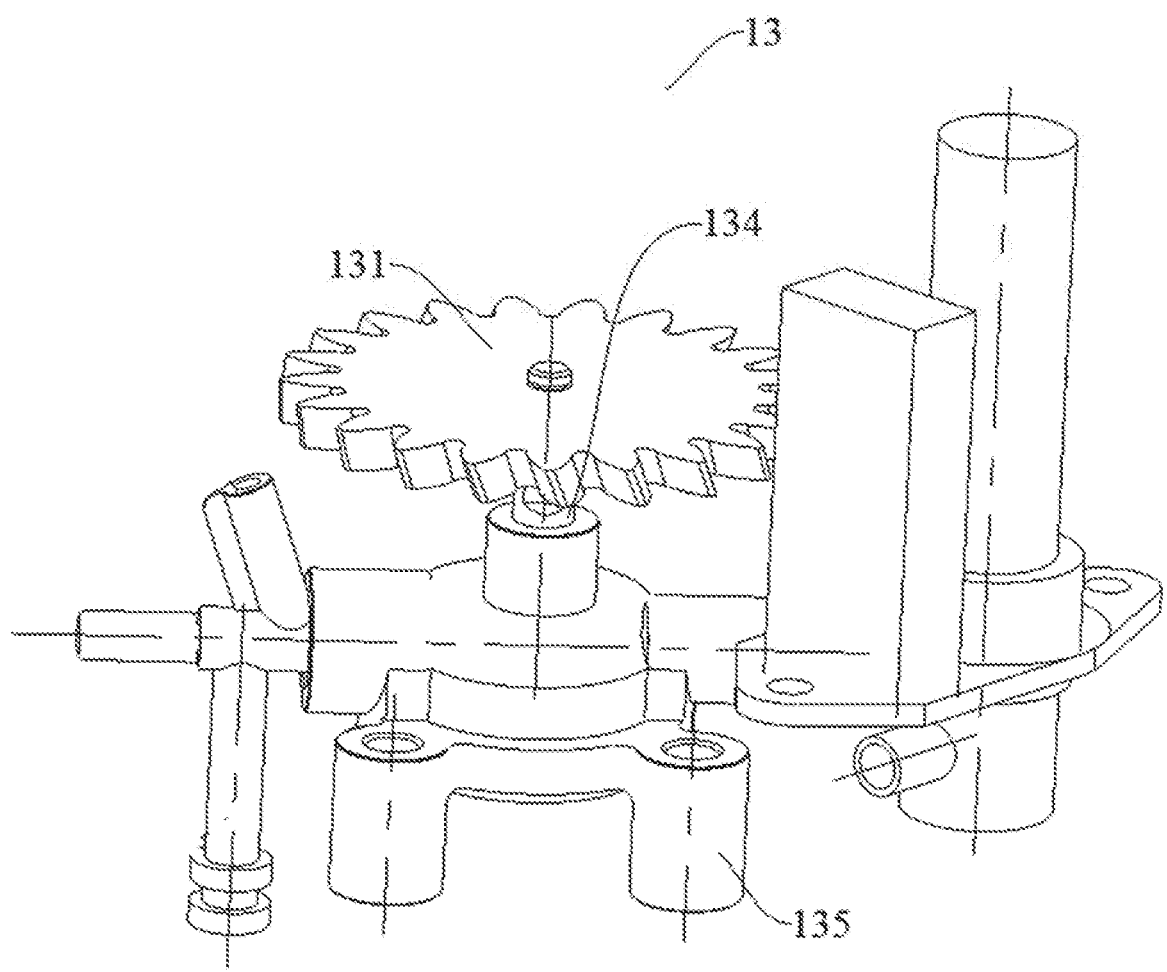
FIG. 19 is a schematic structural diagram of an oil pump of an electric assembly according to an embodiment of the present disclosure.

In an embodiment, as shown in FIG. 19, the electric assembly 1 further includes an oil pump 13, where the oil pump 13 is disposed on the box assembly 100 and configured to transport the cooling lubricating liquid in the transmission holding cavity 120 to the transmission 400 and the mounting plate 160. In this way, the cooling lubricating liquid may be driven by using the oil pump 13 to flow in the box assembly 100, and the cooling lubricating liquid is transported to the mounting plate 160, to help cool the mounting plate 160. Further, the box assembly 100 transfers heat through the mounting plate 160, to help cool the motor housing 140, thereby cooling the motor 200 in the motor housing 140, further improving the cooling effect of the transmission 400 and the mounting plate 160, and cooling the motor 200 through the mounting plate 160, so as to further improve the entire cooling effect of the electric assembly 1.

Specifically, the motor housing 140 may be provided with a motor cooling liquid passage that may cool the motor 200, the motor housing 140 is sleeved over the periphery of a stator, so as to have cooling and heat dissipation effects on the stator, and the mounting plate 160 is disposed on a side of an end of the motor 200, to mainly perform cooling and heat dissipation on the end and a coil of the motor 200, thereby fully cooling the motor 200. The two cooling manners have respective focuses, to jointly achieve a full cooling effect. On the other hand, the transmission 400 is cooled through the motor cooling liquid of the motor 200, and meanwhile the lubricating cooling liquid of the transmission 400 cools the motor 200, to reinforce the cooling effect on the electric assembly 1 through a combination of the two, thereby jointly achieving a full cooling effect on the electric assembly 1.

Figure 20:
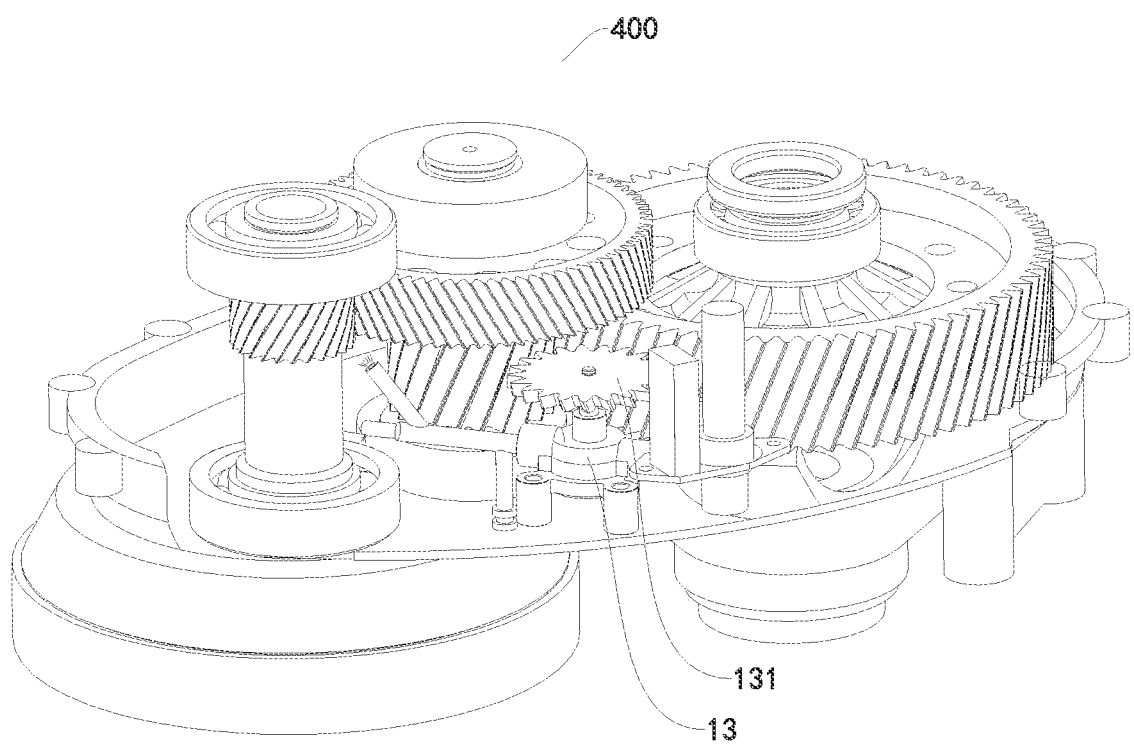
FIG. 20 is a schematic local structural diagram of an electric assembly according to an embodiment of the present disclosure.

In an embodiment of the present disclosure, as shown in FIG. 20, the oil pump 13 is mounted in the box assembly 100, and the oil pump 13 is in transmission connection to the transmission 400 and is driven by the transmission 400. In this way, the oil pump 13 is driven by the transmission 400 to transport the cooling lubricating liquid to the transmission 400, and oil line disposition of the electric assembly 1 may be facilitated, to help the electric assembly 1 be more fully lubricated and cooled.

Furthermore, the transmission 400 is lubricated by using the oil pump 13, and the electric assembly 1 does not have a high requirement on space arrangement of a gear shaft. Even if the gear shaft is arranged higher than an oil liquid surface, key parts can still be lubricated in time. Therefore, an arrangement angle of the electric assembly 1 on the entire vehicle is broader, a proper mounting angle of the power assembly may be obtained through adjustment according to the arrangement of the entire vehicle, and the adaptability is relatively high.

Moreover, the oil pump 13 is driven through the transmission 400 to run, no additional power (for example, motor) needs to be disposed to drive the oil pump 13, the structure is simple, and the adaptability is good; and the amount of the cooling lubricating liquid may be adjusted according to the vehicle speed, and the lubricating efficiency is relatively high.

Furthermore, as shown in FIG. 19, the oil pump 13 has a mounting seat 135, and the oil pump 13 is mounted on an inner wall of the transmission holding cavity 120 through the mounting seat 135. Specifically, the mounting seat 135 is disposed on the bottom of the oil pump 13, the mounting seat 135 is provided with a mounting hole, and a bolt is inserted into the mounting hole and is in threaded connection to the inner wall of the transmission box 101, so that the fixing effect of the oil pump 13 and the inner wall of the transmission box 101 is good. Moreover, the oil pump 13 is disposed in the transmission 400, transmission may be performed by using power in the electric assembly 1, and no external space is occupied.

Specifically, as shown in FIG. 19, the oil pump 13 includes a spindle 134, where the spindle 134 is connected to a driving gear 131, the driving gear 131 is in transmission connection to the transmission 400, and the oil pump 13 is in transmission connection to the driving gear 131 through the spindle 134 and is driven by the driving gear 131. Therefore, the rotation effect of the driving gear 131 is more stable. In this way, the driving gear 131 on the oil pump 13 may drive the spindle 134 to rotate to make the oil pump 13 pump oil. Therefore, no additional motor needs to be disposed to drive the oil pump 13, and the displacement of the oil pump 13 depends on the rotational speed of a driven gear. When the vehicle speed is higher, that is, the rotational speed of the driven gear is also higher, the displacement of the oil pump 13 is also larger, and the lubricating effect of the transmission 400 does not become poorer as the vehicle speed becomes higher; and when the vehicle speed is relatively low, that is, the rotational speed of the driven gear is relatively low, the transmission 400 requires a relatively small amount of the cooling lubricating liquid, and the displacement of the oil pump 13 is also low accordingly, to further improve the lubricating efficiency on the transmission 400.

More specifically, the oil pump 13 is in transmission connection to the driving gear 131 through the spindle 134. While the driving gear 131 is rotating, the spindle 134 is driven to rotate, and the spindle 134 is connected to a gear or paddle in the oil pump 13, thereby driving the gear or paddle in the oil pump 13 to rotate.

The driving gear 131 may be a metal gear or non-metal gear, and a most lightweight gear may be selected according to an actual requirement. Therefore, the rotation effect of the driving gear 131 is more stable. The oil pump 13 may be a gear pump, and the spindle 134 may drive the gear in the oil pump 13 to rotate, so that the low-pressure cooling lubricating liquid sucked into the oil pump 13 becomes high-pressure oil discharged from the oil pump 13; or the oil pump 13 may be a paddle pump, and the spindle 134 may drive a paddle wheel in the oil pump 13 to rotate, to increase the pressure of the cooling lubricating liquid. The oil pump 13 of the electric assembly 1 in one embodiment of the present disclosure refers to a device that can transport the cooling lubricating liquid to each key part of the transmission 400.

Specifically, the electric assembly 1 further includes an oil transportation pipe, where the oil pump 13 transports the cooling lubricating liquid in the transmission holding cavity 120 to the mounting plate 160 through the oil transportation pipe. In this way, it is convenient to smoothly transport the cooling lubricating liquid, improve the transport capability and cooling effect of the cooling lubricating liquid, further transport the cooling lubricating liquid to the mounting plate 160, and cool the mounting plate 160. Further, the box assembly 100 transfers heat through the mounting plate 160, and it is further convenient to cool the entire box assembly 100.

More specifically, the oil pump transports the cooling lubricating liquid in the transmission holding cavity to the mounting plate and at least one gear location and/or at least one bearing location and/or at least one meshing location through the oil transportation pipe. In other words, the oil pump 13 may transport the cooling lubricating liquid to at least one of the gear location, the bearing location and the meshing location through the oil transportation pipe. The oil transportation pipe transports the cooling lubricating liquid in the transmission box 101 to the oil pump 13, and then the oil pump 13 transports the cooling lubricating liquid to a driving bearing location, a driving gear, and a meshing location and a transmission bearing location of a first transmission gear. It may be understood that, the transporting, by the oil transportation pipe, the cooling lubricating liquid to a part of a speed change mechanism 12 is merely to better understand the present disclosure, but cannot be understood as a limitation on the present disclosure.

Figure 21:
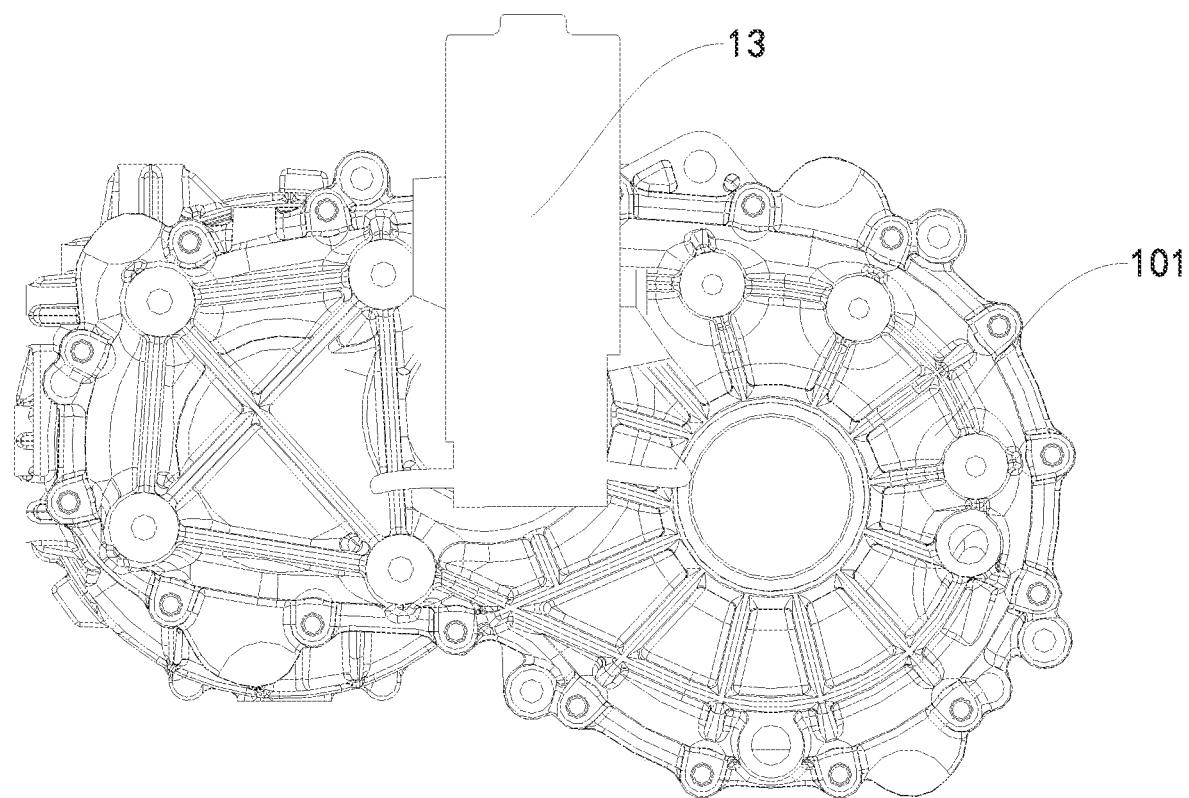
FIG. 21 is a schematic local structural diagram of an electric assembly according to another embodiment of the present disclosure.
Figure 22:
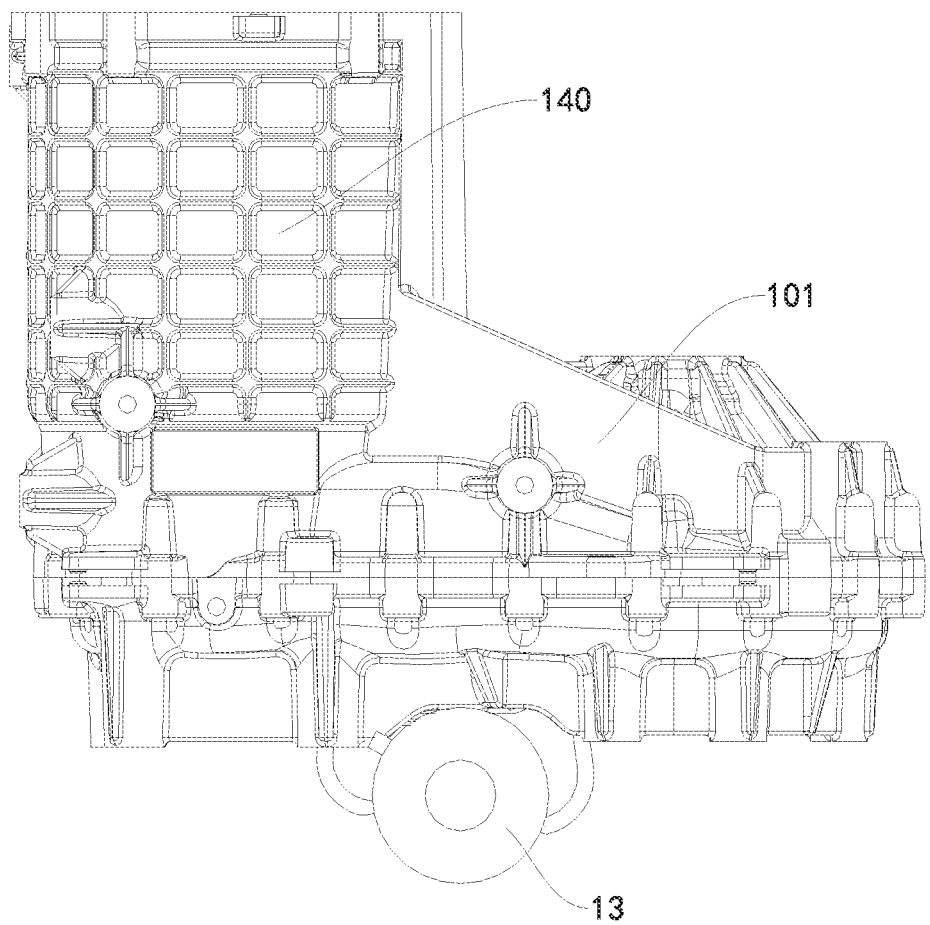
FIG. 22 is a schematic local structural diagram of an electric assembly according to another embodiment of the present disclosure.
Figure 23:
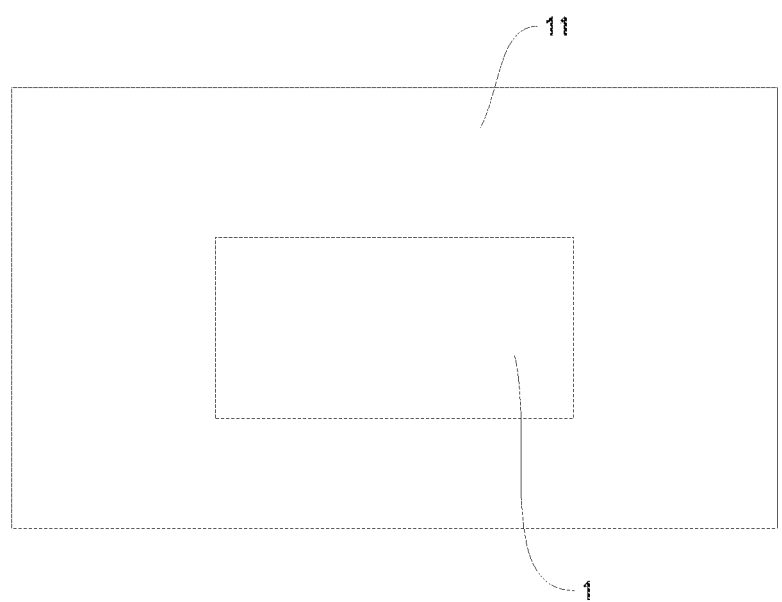
FIG. 23 is a schematic structural diagram of a vehicle according to an embodiment of the present disclosure.

According to another embodiment of the present disclosure, as shown in FIG. 21 and FIG. 22, the oil pump 13 is mounted outside the box assembly 100. In this way, a case in which the oil pump 13 is disposed to affect the internal structure of the box assembly 100 may be avoided, to improve the disposition flexibility of the oil pump 13. Moreover, a requirement of a key part such as a bearing or a gear on lubrication may be met, and the lubricating effect is good.

Specifically, the oil pump 13 is driven through an external motor or driven through a transmission mechanism of the transmission 400. In this way, power may be provided for the oil pump 13, and the disposition flexibility of the oil pump 13 is improved, to help the oil pump 13 transport the cooling lubricating liquid, and help further improve the cooling performance of the electric assembly 1.

In an embodiment, an oil guiding passage making the transmission holding cavity 120 and the oil pump 13 be in communication with each other is disposed in a wall of the box assembly 100. Specifically, the oil guiding passage is formed in the wall of the box assembly 100 in a punching manner. In this way, it is convenient to smoothly transport the cooling lubricating liquid, and it is convenient for the cooling lubricating liquid to perform heat dissipation and temperature reduction on the electric assembly 1. Particularly, it may be convenient to lubricate the bearing and the spline. For example, the oil guiding passage may be extended to the bearing or spline location, to directly transport the cooling lubricating liquid to the bearing or spline location, thereby avoiding a case in which injection of the oil liquid affects the cooling and lubricating effects.

Specifically, the oil pump 13 transports the cooling lubricating liquid in the transmission holding cavity 120 to the mounting plate 160 and at least one gear location and/or at least one bearing location and/or at least one meshing location through the oil guiding passage. Specifically, the oil pump 13 may transport the cooling lubricating liquid to at least one of the gear location, the bearing location and the meshing location through the oil guiding passage. In this way, it is not only further convenient to transport the cooling lubricating liquid to the mounting plate 160, to help the cooling lubricating liquid cool the mounting plate 160 and help transfer heat through the mounting plate 160, but also convenient to improve the lubricating performance of the at least one of the gear location, the bearing location and the meshing location, to help the electric assembly 1 smoothly operate and help improve the reliability and stability of the electric assembly 1.

Figure 9:
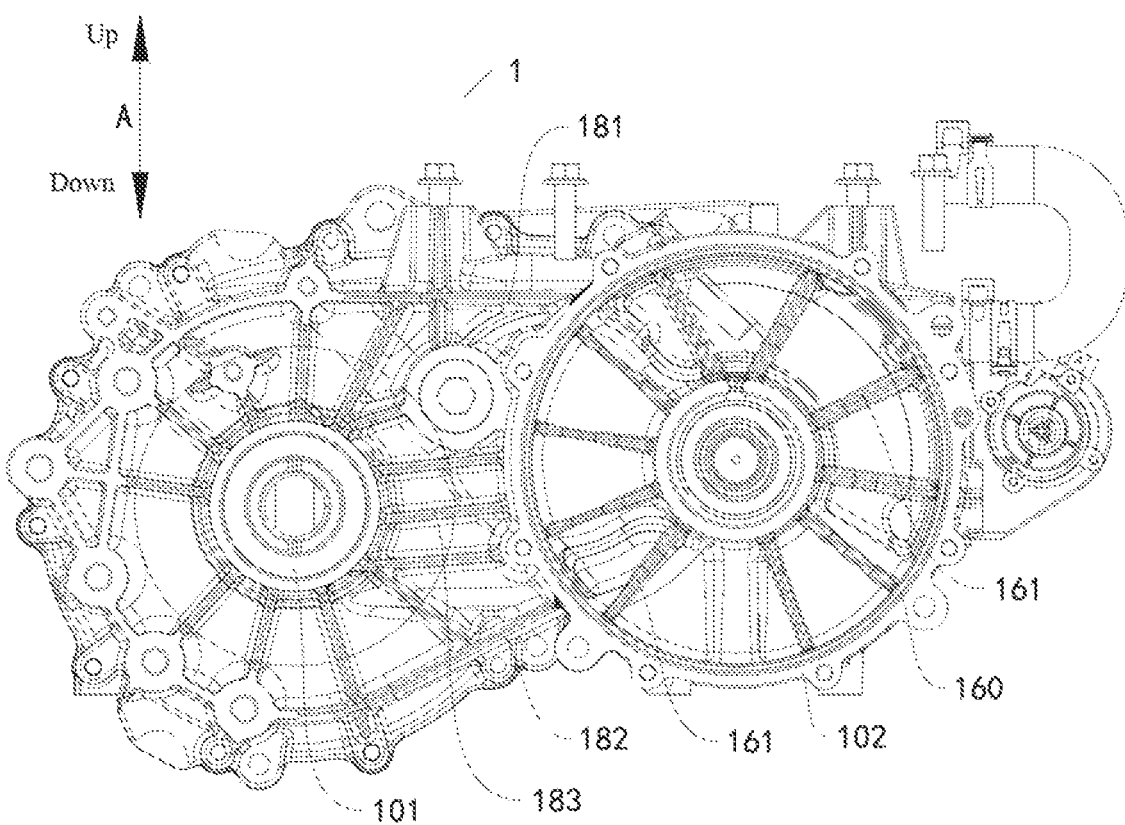
FIG. 9 is a schematic structural diagram of an electric assembly according to an embodiment of the present disclosure.
Figure 10:
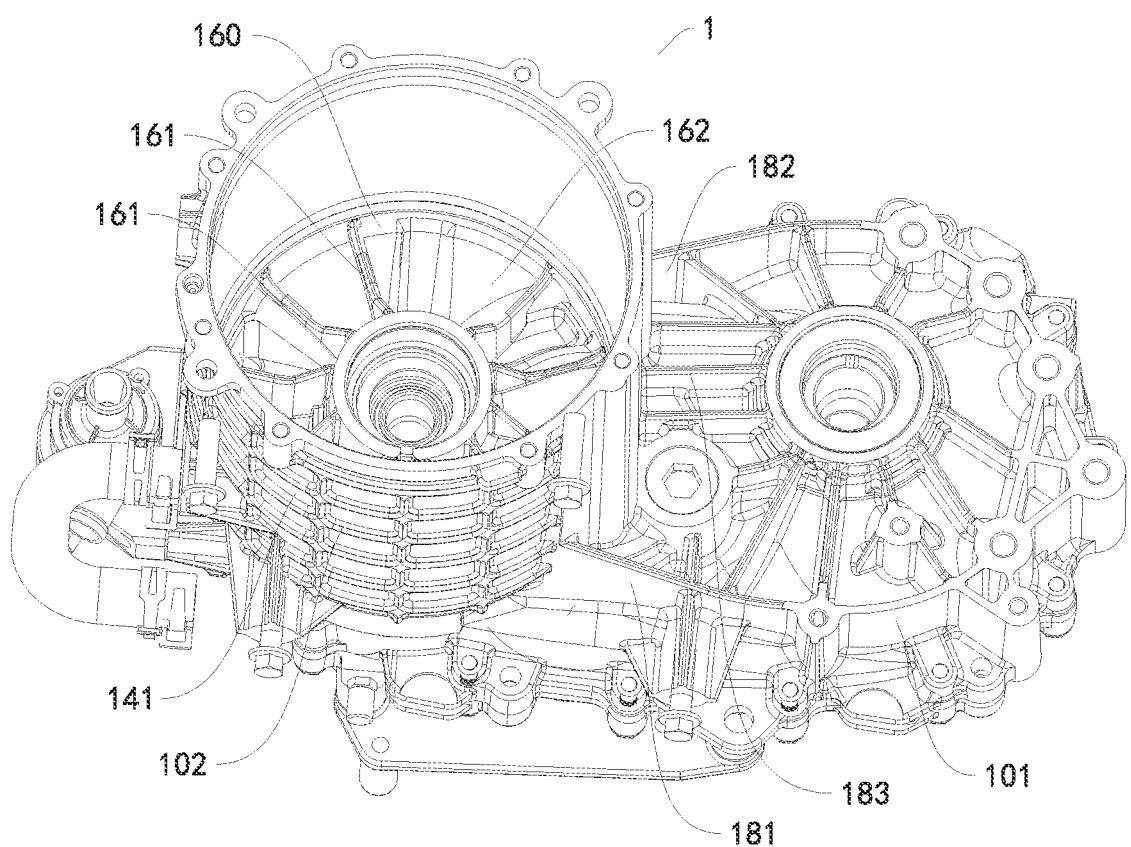
FIG. 10 is a schematic structural diagram of an electric assembly according to an embodiment of the present disclosure.

In an embodiment, a distance between the motor 200 and the mounting plate 160 is less than a preset distance. It should be understood herein that, the preset distance is a maximum distance making the mounting plate 160 cool the motor 200, and a person skilled in the art may learn the preset distance through the rated voltage and rated current of the electric assembly 1. For example, the distance between the motor 200 and the mounting plate 160 may be less than 10 millimeters, and is preferably 7.5 millimeters. Because the motor is close to the mounting plate 160, the motor 200 and the mounting plate 160 may be cooled at a short distance between each other, and after the mounting plate 160 is cooled, the motor 200 can be quickly cooled. In an embodiment, as shown in FIG. 9 and FIG. 10, a surface of the mounting plate 160 facing the motor 200 and/or the transmission 400 is provided with ribs. Because the ribs enhance the rigidity of the box assembly 100 and improve the natural frequency, resonance may be prevented from occurring in the electric assembly 1, to reduce the noise of the electric assembly 1. In this way, the contact area between the cooling lubricating liquid and the mounting plate 160 may be increased, so that the cooling lubricating liquid cools the mounting plate 160 more fully.

Specifically, during rotation of the motor 200, a stress is transferred to the box assembly 100 through a bearing, and ribs are added to the box assembly 100, to help increase rigidity and strength of the box assembly 100, prevent the box assembly 100 from being in contact with a coil of the motor 200, prevent components of the motor 200 from being damaged, and further improve operating reliability and stability of the motor 200.

Further, the ribs divide a space between the mounting plate 160 and the motor 200 into a plurality of cavities 162. In this way, forming of the cavities 162 is facilitated, so as to cool the motor 200 by using air passing through the cavities 162.

Figure 12:
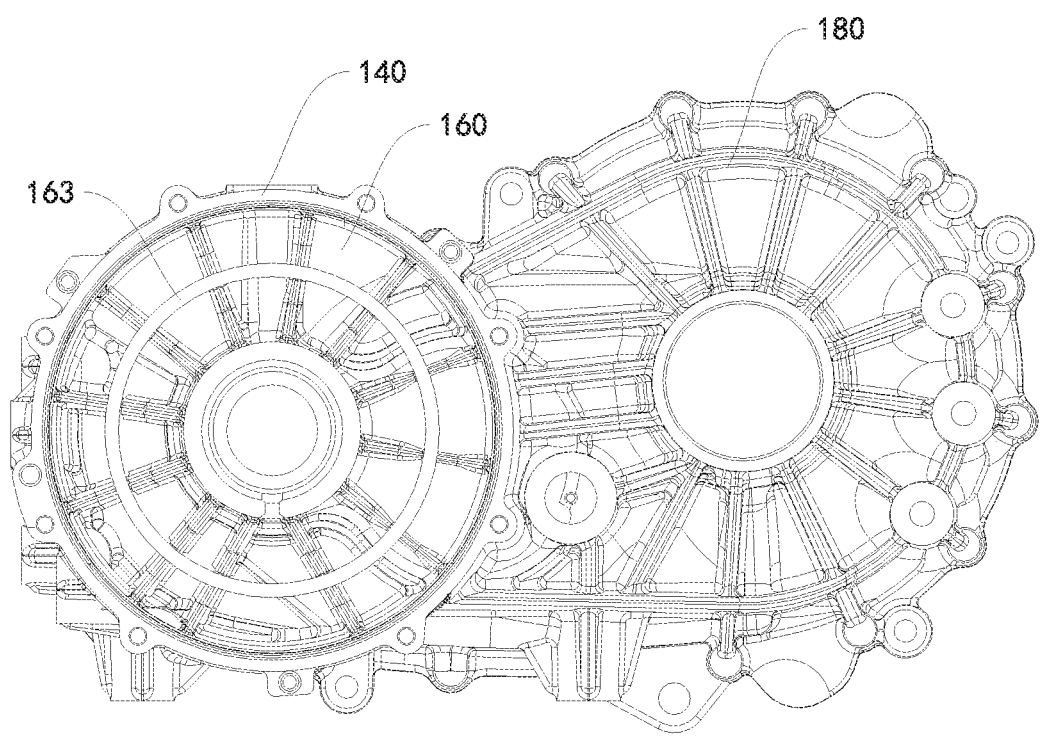
FIG. 12 is a schematic local structural diagram of an electric assembly according to another embodiment of the present disclosure.

According to an embodiment of the present disclosure, as shown in FIG. 12, the ribs include an annular rib 163 extending along a circumferential direction of the motor 200. In this way, rigidity and strength of the box assembly 100 may be improved, the structure stability of the box assembly 100 may be improved, and the heat dissipation capability and the cooling effect of the box assembly 100 may be improved.

According to another embodiment of the present disclosure, as shown in FIG. 10, the ribs include strip-shaped ribs 161 extending along a radial direction of the motor 200, there are a plurality of strip-shaped ribs 161 and the plurality of strip-shaped ribs 161 are spaced apart along a circumferential direction of the mounting plate 160. In this way, a more even force may be applied to the box assembly 100, to further help improve rigidity and strength of the box assembly 100, further help improve noise reduction performance and heat dissipation performance of the electric assembly 1, and improve the cooling effect of the electric assembly 1.

According to another embodiment of the present disclosure, the ribs include an annular rib 163 extending along a circumferential direction of the motor 200 and strip-shaped ribs 161 extending along a radial direction of the motor 200, there are a plurality of strip-shaped ribs 161 and the plurality of strip-shaped ribs 161 are spaced apart along a circumferential direction of the mounting plate 160. In this way, rigidity and strength of the box assembly 100 along the circumferential direction and the radial direction of the motor 200 may be improved at the same time, thereby improving the structure reliability of the box assembly 100, further improving the heat dissipation area of the box assembly 100, and improving heat dissipation and cooling performance of the electric assembly 1.

Specifically, heights of the strip-shaped ribs 161 relative to the mounting plate 160 gradually decrease from a center portion of the mounting plate to a periphery portion of the mounting plate. In this way, the disposition space of the strip-shaped ribs 161 may be reduced, to prevent the strip-shaped ribs 161 from occupying excessive space in the box assembly 100, and further facilitate mounting and disposition of the motor 200 and the transmission 400. On the other hand, the heights of the strip-shaped ribs 161 relative to the mounting plate 160 gradually decrease from a center portion of the mounting plate to a periphery portion of the mounting plate, and the center portion has a largest height, and may bear a high strength load formed by a bearing on the box assembly 100.

According to an embodiment of the present disclosure, the box assembly 100 includes a transmission box 101 and a motor box 102, the transmission box 101 includes a front box 180 and a rear box 190, the motor box 102 includes a motor housing 140 and a motor backend cover 150, the front box 180 and the motor housing 140 are disposed adjacent to each other, and the mounting plate 160 is constructed as a part of the front box 180 or a part of the motor housing 140. In this way, it is convenient for the electric assembly 1 to become a three-segment structure, forming of the transmission holding cavity 120 and the motor holding cavity 110 is facilitated, and mounting and dismounting of the electric assembly 1 are facilitated. Moreover, the mounting plate 160 is a part of the front box 180 or a part of the motor housing 140, and the mounting plate 160 is integrated on the box assembly 100, so that the structure of the box assembly 100 may be made more proper and compact, and the mounting plate 160 may be cooled by the lubricating liquid of the transmission 400, thereby improving the lubricating and cooling effect of the mounting plate 160.

Further, the front box 180 and the motor housing 140 are integrally formed or detachably connected. In this way, the electric assembly 1 may be a three-segment structure, to facilitate the disposition of the motor 200 and the transmission 400.

According to another embodiment of the present disclosure, as shown in FIG. 9 and FIG. 10, the box assembly 100 includes a transmission box 101 and a motor box 102, the transmission box 101 includes a front box 180 and a rear box 190, the motor box 102 includes a motor frontend cover 170, a motor housing 140 and a motor backend cover 150, and the mounting plate 160 is constructed as a part of the front box 180 or a part of the motor frontend cover 170. In this way, it is convenient for the electric assembly 1 to become a three-segment structure, forming of the transmission holding cavity 120 and the motor holding cavity 110 is facilitated, and mounting and dismounting of the electric assembly 1 are facilitated. Moreover, the mounting plate 160 is a part of the front box 180 or a part of the motor housing 140, and the mounting plate 160 is integrated on the box assembly 100, so that the structure of the box assembly 100 may be made more proper and compact, and the mounting plate 160 may be cooled by the lubricating liquid of the transmission 400, thereby improving the lubricating and cooling effect of the mounting plate 160.

Figure 2:
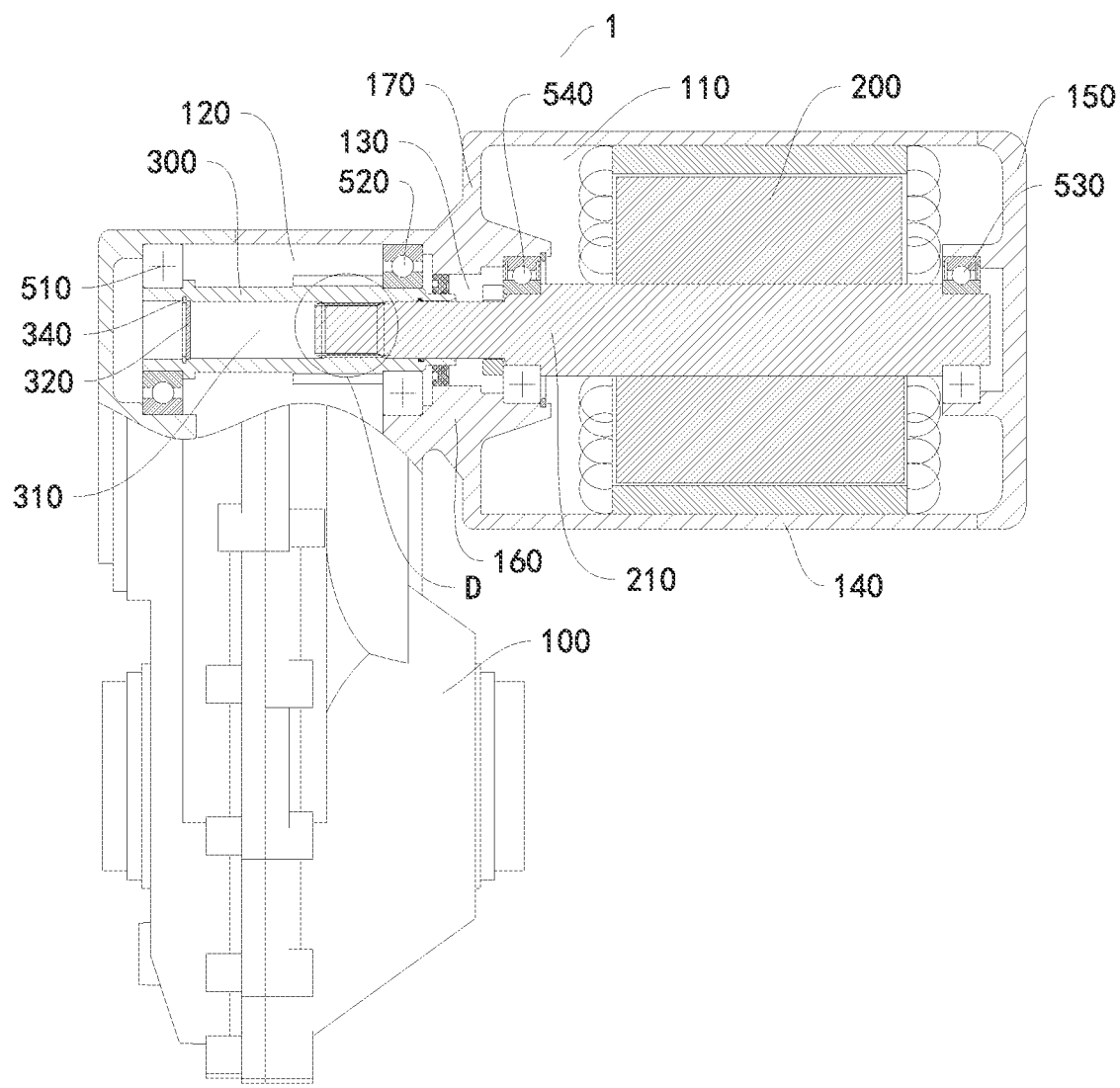
FIG. 2 is a local cross-sectional view of an electric assembly according to an embodiment of the present disclosure.

According to an embodiment of the present disclosure, as shown in FIG. 2, the motor housing 140, the motor frontend cover 170 and the front box 180 are integrally formed or each two of the motor housing 140, the motor frontend cover 170 and the front box 180 are detachably connected. In this way, the structure flexibility of the box assembly may be improved, to facilitate optimization of the structure of the box assembly 100, facilitate reduction of the weight of the box assembly 100, and improve the endurance capability of the electric assembly 1.

According to another embodiment of the present disclosure, the motor frontend cover 170 and the front box 180 are integrally formed, and the motor housing 140 and the motor frontend cover 170 are detachably connected. In this way, simplification of the assembly process of the box assembly 100 is facilitated, thereby improving the assembly efficiency of the box assembly 100.

According to another embodiment of the present disclosure, the motor frontend cover 170 and the motor housing 140 are integrally formed, and the motor frontend cover 170 and the front box 180 are detachably connected. In this way, mutual separation between the transmission box 101 and motor box 102 is facilitated, to help improve the structure flexibility of the box assembly 100.

According to another embodiment of the present disclosure, the motor housing 140 is connected to the motor frontend cover 170 through a bolt, the motor frontend cover 170 is connected to the front box 180 through a bolt, and the motor housing 140 is connected to the motor backend cover 150 through a bolt. In this way, machining and forming of the motor housing 140, the motor frontend cover 170, the front box 180 and the rear box 190 are facilitated, so as to simplify the forming process. The motor housing 140 the front box 180 the rear box 190 the motor backend cover 150 the motor housing 140 the front box 180 the motor housing 140. Because each of the motor frontend cover 170, the motor housing 140 and the motor backend cover 150 is detachable, the length of the motor 200 may be adjusted. For example, the length of the motor housing 140 as a standard member may be individually adjusted, thereby improving the structure flexibility and the application range of the motor 200.

Specifically, as shown in FIG. 9, one or more of a first connection rib 181, a second connection rib 182 and a third connection rib 183 are connected between an outer surface of the front box 180 and an outer surface of the motor housing 140, the first connection rib 181 is connected between (an up-down direction is shown by an arrow A in FIG. 9) an upper end face of the motor housing 140 and an upper end face of the front box 180, the second connection rib 182 is connected between a lower end face of the motor housing 140 and a lower end face of the front box 180, and the third connection rib 183 is located between the first connection rib 181 and the second connection rib 182. In this way, the strength of connection between the front box 180 and the motor housing 140 may be reinforced, to avoid a case in which a point with weak strength occurs in a connection location between the front box 180 and the motor housing 140 to cause deformation or damage, thereby improving the entire structure performance of the box assembly 100.

Figure 3:
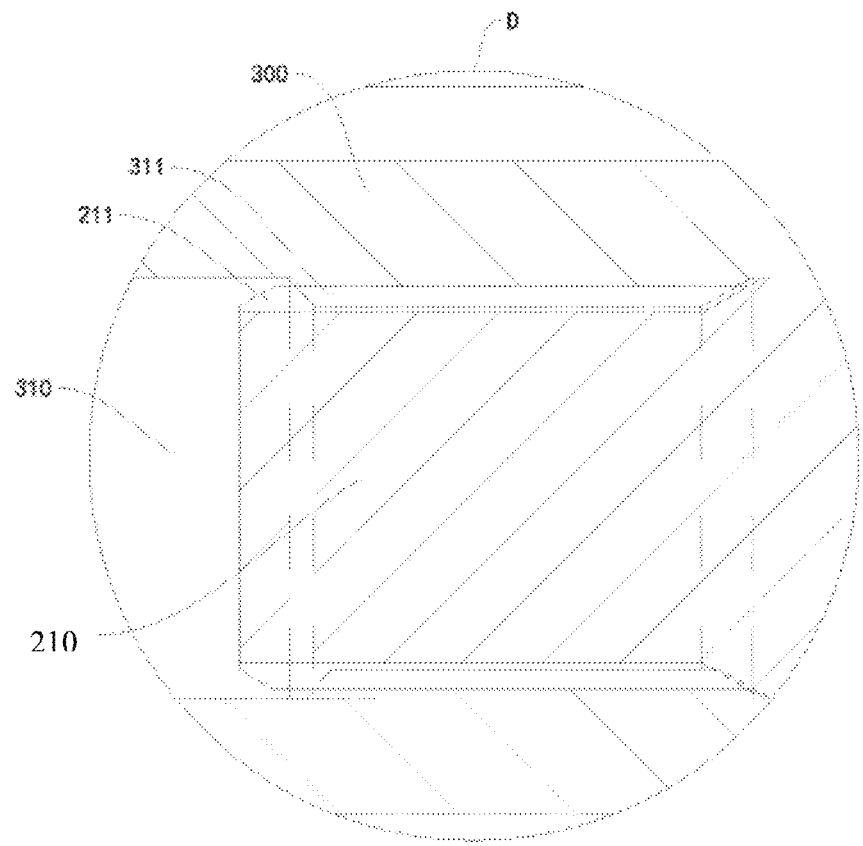
FIG. 3 is an enlarged diagram of a location D in FIG. 2.
Figure 4:
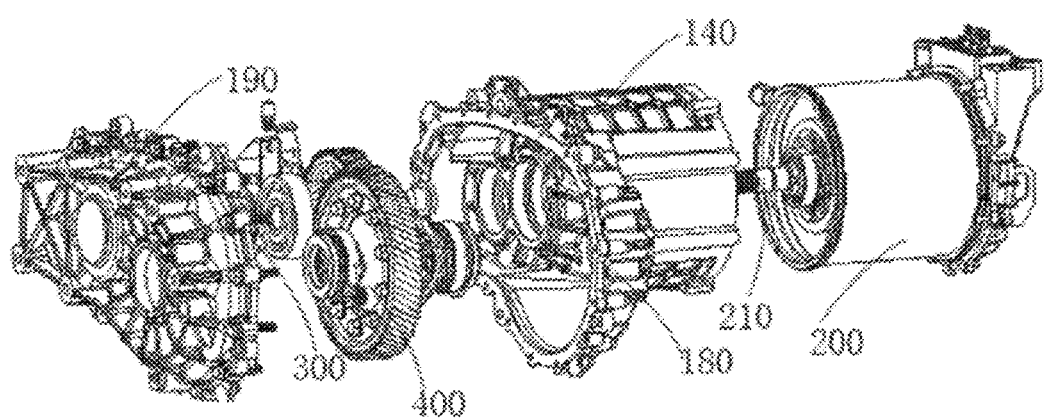
FIG. 4 is an exploded view of an electric assembly according to an embodiment of the present disclosure.
Figure 5:
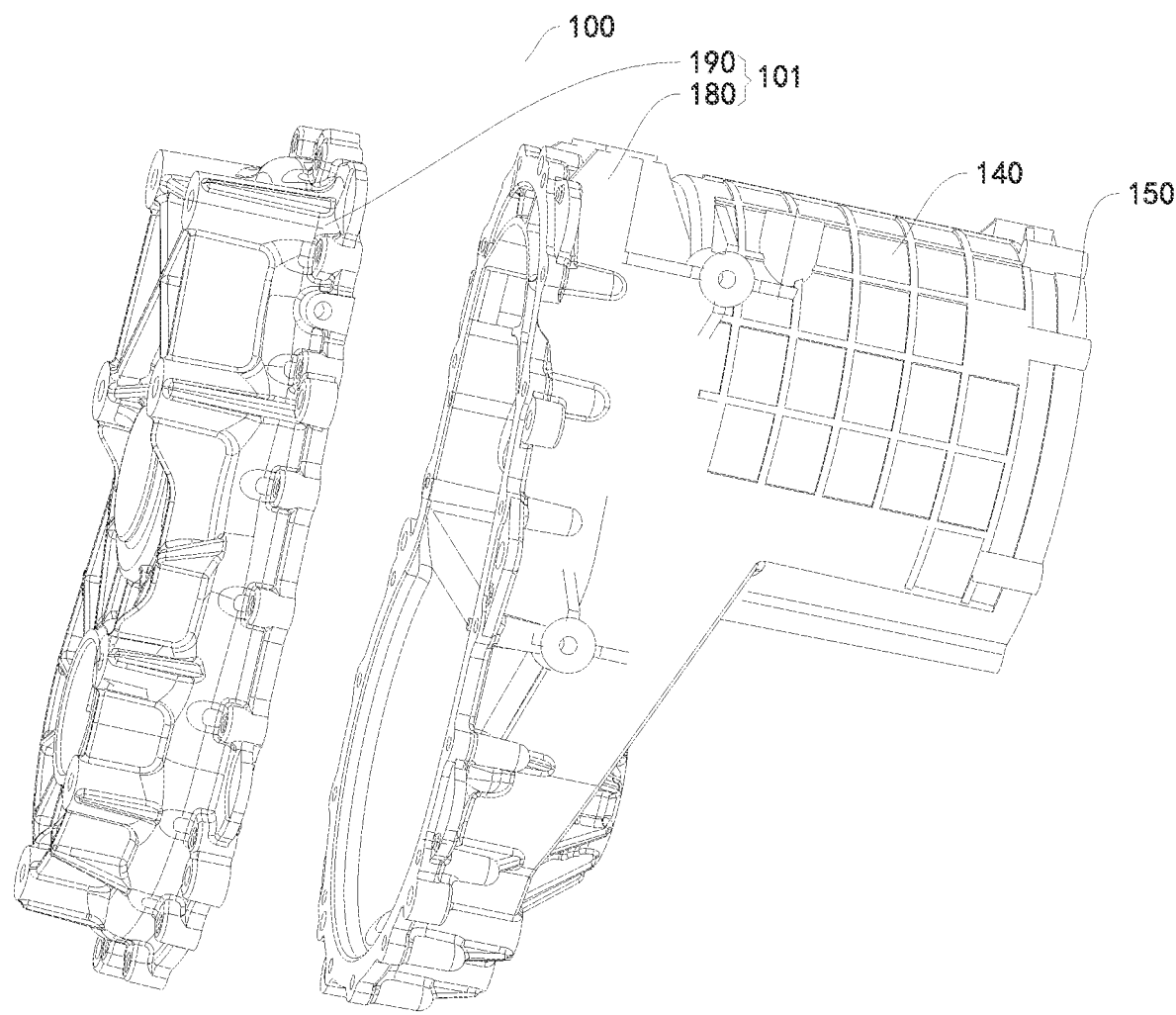
FIG. 5 is an exploded view of a box assembly of an electric assembly according to an embodiment of the present disclosure.

In an embodiment, as shown in FIG. 3, the transmission 400 includes a main shaft 300, the main shaft 300 is power-coupled to a motor shaft 210 of the motor 200, at least one of the motor shaft 210 and the main shaft 300 is threaded through a shaft via-hole 130 and is connected to the other one, and the main shaft 300 is connected to the motor shaft 210 of the motor 200 through splines. In this way, direct transmission between the motor shaft 210 and the main shaft 300 is facilitated, and an additional transmission structure may be left out, to further simplify the structure of the electric assembly 1, improve the integration level of the electric assembly 1, help transfer power outputted by the motor 200 to the transmission 400 in time, help improve the transmission efficiency of the electric assembly 1, and help improve timeliness and accuracy of power transmission of the electric assembly 1. In this way, the main shaft 300 and the motor shaft 210 may be fixed and positioned by using splines, to prevent relative rotation from occurring between the main shaft 300 and the motor shaft 210, facilitate reliable transmission of the electric assembly 1, and help ensure transmission efficiency of the electric assembly 1. In this way, another structure connecting the main shaft 300 and the motor shaft 210 may be left out, thereby further simplifying the structure of the electric assembly 1, and improving the integration level of the electric assembly 1, and because the main shaft 300 and the motor shaft 210 are sleeved over each other, the shaft spacing of the electric assembly 1 is further shortened, so as to further control the size of the electric assembly 1 in the axial direction of the motor shaft 210.

Further, as shown in FIG. 2, the main shaft 300 is provided with a shaft hole 310, an inner circumferential surface of the shaft hole 310 is provided with inner splines 311, an outer circumferential surface of the motor shaft 210 is provided with outer splines 211, the motor shaft 210 of the motor 200 is matched in the shaft hole 310 and the inner splines 311 match the outer splines 211. In this way, machining of the inner splines 311 is facilitated, to help improve machining precision of the inner splines 311. Through the matching between the inner splines 311 and the outer splines 211, transmission connection between the main shaft 300 and the motor shaft 210 may be implemented, and reliable positioning between the main shaft 300 and the motor shaft 210 may be implemented, to further prevent relative rotation from occurring between the main shaft 300 and the motor shaft 210. Moreover, the motor 200 is a three-segment motor, the main shaft 300 and the motor shaft 210 are sleeved over each other, and the length of the motor 200 may be adjusted according to a requirement, to help change torque and power of the motor 200, and help improve compatibility of the motor 200.

Specifically, the shaft hole 310 runs through the main shaft 300 along an axial direction of the main shaft 300, an oil baffle 320 is matched in the shaft hole 310, the oil baffle 320, an inner circumferential wall of the shaft hole 310 and the motor shaft 210 jointly define an oil storage cavity 330, the oil storage cavity 330 is filled with lubricating oil, and the oil baffle 320 is provided with an air vent 350. In this way, the disposition of the lubricating oil is facilitated, and the lubricating oil in the shaft hole 310 can be effectively prevented from leaking, to play a role of protecting a spline lubricating system. In this way, the main shaft 300 may have an oil storage function, the splines may be lubricated and cooled, the air vent 350 may discharge generated gas at the right time, and the disposition of the shaft hole 310 running through along the axial direction of the main shaft 300 may avoid a case in which gas exists in the shaft hole 310 to affect mounting of the motor shaft 210 and the main shaft 300.

More specifically, a seal retainer ring is matched between the oil baffle 320 and the shaft hole 310 and between the outer circumferential surface of the motor shaft 210 and the inner circumferential surface of the shaft hole 310. In this way, it is convenient to seal the oil storage cavity 330, and the lubricating oil in the oil storage cavity 330 may be prevented from leaking, thereby improving the seal effect of the oil storage cavity 330.

Specifically, as shown in FIG. 2, the electric assembly 1 further includes a plurality of bearings, and the plurality of bearings are respectively sleeved over the motor shaft 210 and the main shaft 300 and are spaced apart along the axial direction of the motor shaft 210 and the main shaft 300. In this way, smooth rotation of the motor shaft 210 and the main shaft 300 is facilitated, to help improve reliability and accuracy of rotation of the motor shaft 210 and the main shaft 300.

Figure 8:
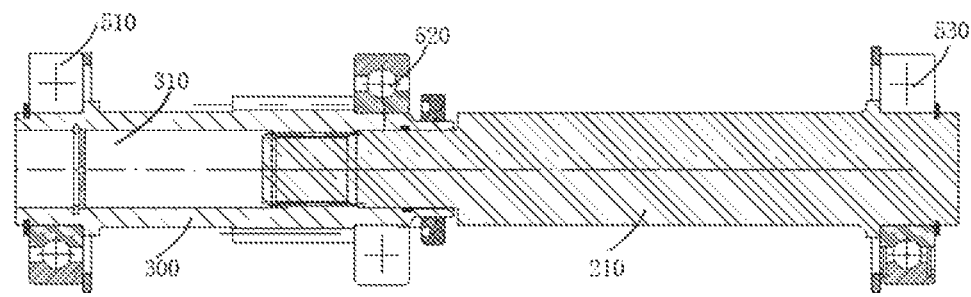
FIG. 8 is a local cross-sectional view of an electric assembly according to another embodiment of the present disclosure.

According to an embodiment of the present disclosure, as shown in FIG. 8, the plurality of bearings include a first bearing 510, a second bearing 520 and a third bearing 530, the first bearing 510 and the second bearing 520 are respectively disposed adjacent to two ends of the main shaft 300, and the third bearing 530 is disposed adjacent to one end of the motor shaft 210 far away from the main shaft 300. In this way, the disposition of the motor shaft 210 and the main shaft 300 is facilitated, to further facilitate smooth rotation of the motor shaft 210 and the main shaft 300, and the quantity of the bearings may be reduced, to reduce costs of the electric assembly 1.

Specifically, the third bearing 530 is disposed between one end of the motor shaft 210 far away from the transmission 400 and the box assembly 100, the first bearing 510 is disposed between one end of the main shaft 300 far away from the motor 200 and the box assembly 100, and the second bearing 520 is disposed between at least one of one end of the motor 200 close to the main shaft 300 and one end of the main shaft 300 close to the motor shaft 210 and the box assembly 100. In this way, the force applied to the motor shaft 210 and the main shaft 300 may be more balanced, to help improve the operating performance of the electric assembly 1.

In an embodiment, the second bearing 520 is sleeved over the main shaft 300 and is located on an overlap between the main shaft 300 and the motor shaft 210 in the axial direction. In this way, the second bearing 520 may be used for supporting the main shaft 300 and the motor shaft 210, to ensure the disposition reliability of the main shaft 300 and the motor shaft 210. Because the overlap between the main shaft 300 and the motor shaft 210 in the axial direction is a place on which rotation forms stress concentration, effective supporting of the second bearing 520 may prevent the main shaft 300 and the motor shaft 210 from being broken, thereby improving the operating performance of the main shaft 300 and the motor shaft 210.

Figure 7:
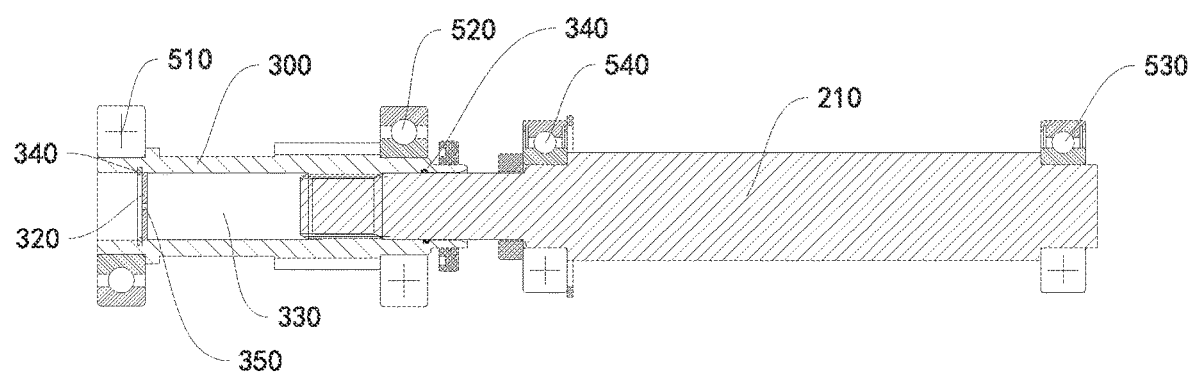
FIG. 7 is a local cross-sectional view of an electric assembly according to an embodiment of the present disclosure.

According to another embodiment of the present disclosure, as shown in FIG. 7, the electric assembly 1 further includes a fourth bearing 540, where the fourth bearing 540 is sleeved over the motor shaft 210 and is located between the motor shaft 210 and the motor housing. In this way, the fourth bearing 540 may be used for reinforcing supporting on the motor shaft 210, thereby further improving the disposition reliability of the motor shaft 210.

Specifically, the fourth bearing 540 is located between the main shaft 300 and a stator of the motor 200 in the axial direction of the motor shaft 210. In this way, the force applied to the main shaft 300 and the motor 200 may be more even, to help improve reliability and stability of power transfer between the main shaft 300 and the motor 200.

Figure 11:
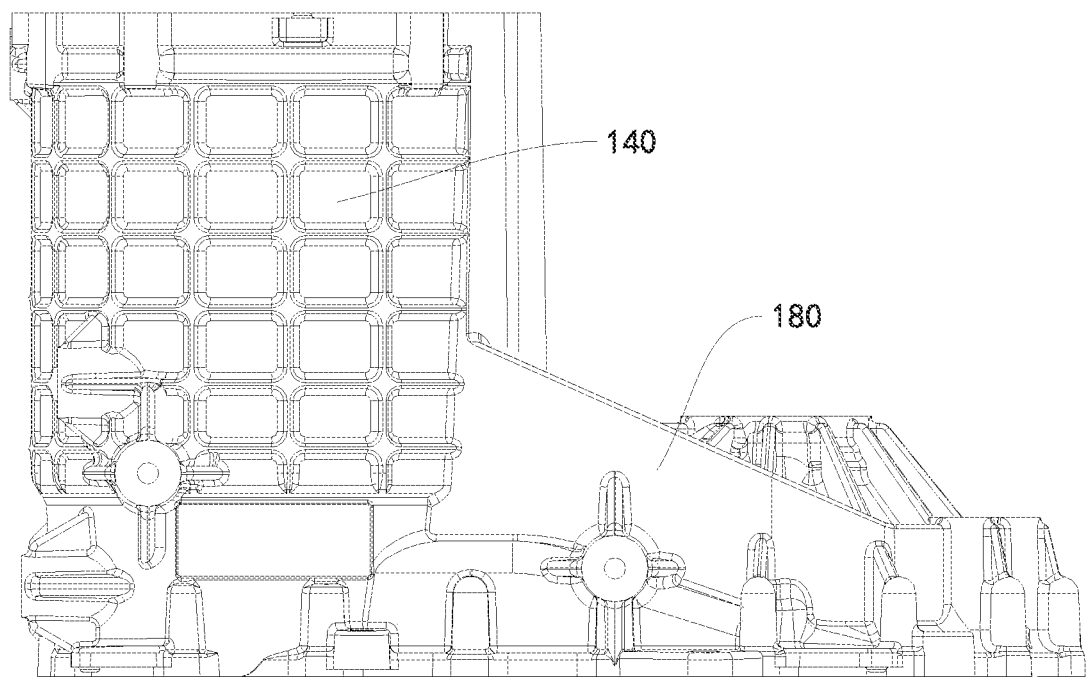
FIG. 11 is a schematic local structural diagram of an electric assembly according to another embodiment of the present disclosure.

In an embodiment, as shown in FIG. 11, an outer surface of the motor housing 140 is provided with reinforcing ribs 141 arranged along the outer surface of the motor housing 140. In this way, it is convenient to improve the strength of the motor housing 140, and the surface area of the motor housing 140 may be increased, thereby improving the heat dissipation performance of the motor housing 140.

Specifically, after the motor backend cover 150 is dismounted, the transmission holding cavity 120 may be opened. In this way, it may be convenient to replace and maintain the transmission 400.

Further, an end face of the motor holding cavity 110 far away from one end of the transmission holding cavity 120 may be opened, and after the motor 200 is mounted to the box assembly 100, the motor backend cover 150 covers the motor holding cavity 110.

In an embodiment, the motor housing 140 and the motor backend cover 150 are mounted through bolts and the front box 180 and the rear box 190 are mounted through bolts. In this way, reliability and stability of the fixed connection between the motor housing 140 and the motor backend cover 150 and between the front box 180 and the rear box 190 may be ensured, and when the electric assembly 1 has a fault, the box assembly 100 may be quickly dismounted, to further facilitate maintenance of the electric assembly 1.

Specifically, as shown in FIG. 2, the first bearing 510 is located on the motor backend cover 150, the second bearing 520 and the fourth bearing 540 are respectively disposed at two ends of the shaft via-hole 130, and the third bearing 530 is located on an end face of the motor holding cavity 110 far away from the transmission holding cavity 120. In this way, the force applied to the main shaft 300 and the motor 200 may be more even, to further help improve the structure stability of the electric assembly 1.

More specifically, the main shaft 300 is provided with a first main shaft positioning slot and a second main shaft positioning slot, the first bearing 510 is matched in the first main shaft positioning slot, and the second bearing 520 is matched in the second main shaft positioning slot. The motor shaft 210 is provided with a third motor shaft positioning slot and a fourth motor shaft positioning slot, the third bearing 530 is matched in the third motor shaft positioning slot, and the fourth bearing 540 is matched in the fourth motor shaft positioning slot. The box assembly 100 is provided with box positioning slots matching the bearings. In this way, the positioning slots may be used for positioning the bearings, to facilitate reliable disposition of the bearings, and help improve location accuracy of the bearings.

In an embodiment, the electric assembly 1 can be directly mounted to the chassis of the vehicle 11 through a suspension mounting point on the box assembly 100. In this way, mounting of the electric assembly 1 is further facilitated, improvement of the mounting efficiency of the vehicle 11 is facilitated, and the mounting costs of the vehicle 11 are reduced.

Figure 6:
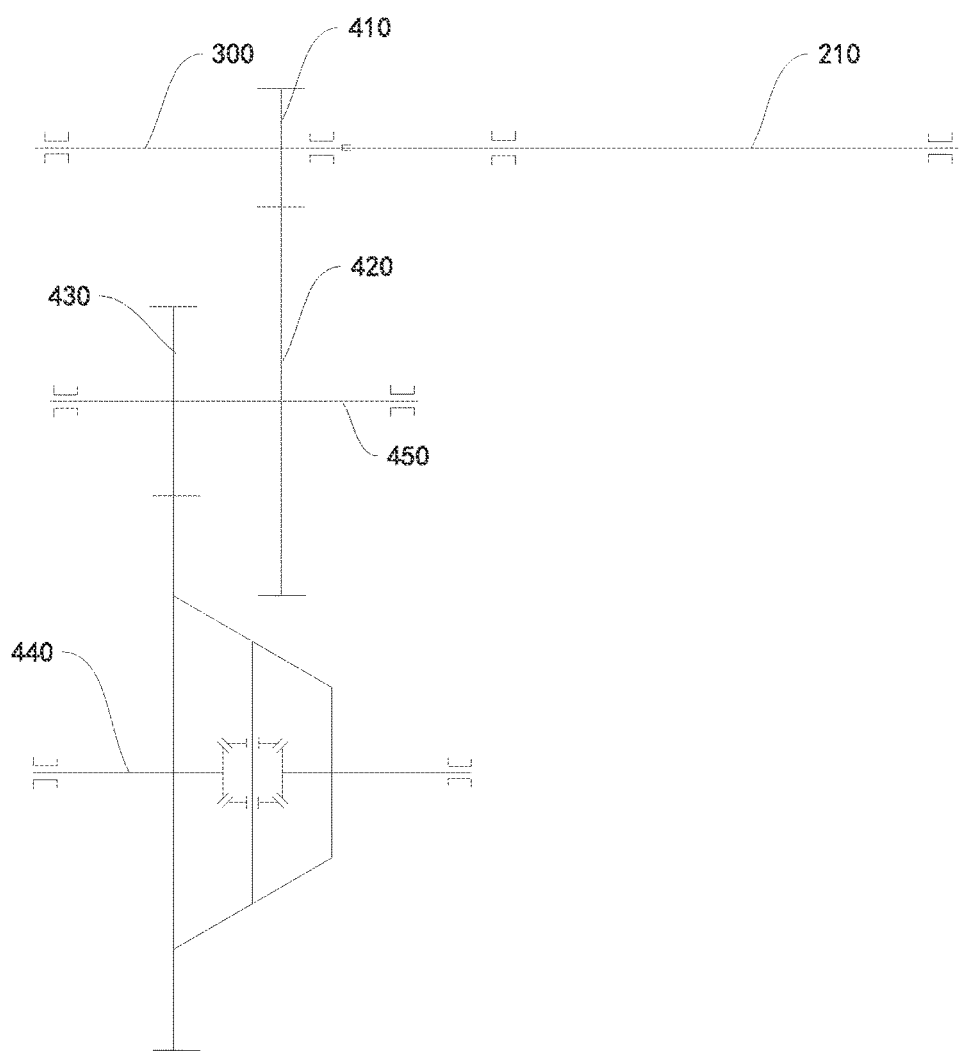
FIG. 6 is a schematic local structural diagram of an electric assembly according to an embodiment of the present disclosure.

Specifically, as shown in FIG. 6, the transmission 400 includes a differential assembly 440, a first gear 410, a second gear 420, a third gear 430 and a transmission shaft 450, the first gear 410 is sleeved over the main shaft 300, the second gear 420 and the third gear 430 are sleeved over the transmission shaft 450, the first gear 410 is meshed with the second gear 420, and the third gear 430 is meshed with the differential assembly 440. In this way, it is convenient for the transmission 400 to implement speed change transmission.

In an embodiment, as shown in FIG. 1, the box assembly 100 includes the cylindrical motor housing 140 and the front box assembly 180 of the transmission connected to the motor housing 140, the motor holding cavity 110 is disposed in the motor housing 140, the transmission holding cavity 120 is disposed between the front box 180 and the rear box 190, and the box of the transmission protrudes outward from the outer circumferential surface of the motor housing 140. In this way, it is convenient for the box assembly 100 to protect the electric assembly 1.

Specifically, as shown in FIG. 6, the axial line of the motor shaft 210 is parallel to those of the main shaft 300, the transmission shaft 450 and the differential assembly 440. In this way, it is convenient for the electric assembly 1 to smoothly transfer power.

In an embodiment, the electric assembly 1 further includes a controller 500, where the controller 500 is mounted outside the box assembly 100 and fixedly connected to the box assembly 100. In this way, the integral disposition of the controller 500 is facilitated, and an external three-phase line disposed between the controller 500 and the motor 200 may be left out, to facilitate optimization of the structure of the electric assembly 1, reduce costs of the electric assembly 1, prevent mounting of the external three-phase line from affecting the seal effect of the electric assembly 1, prevent electric leakage from occurring in the electric assembly 1, improve the operating efficiency of the electric assembly 1, improve the anti-interference capability of the electric assembly 1, and reduce the fault rate of the electric assembly 1.

Figure 13:
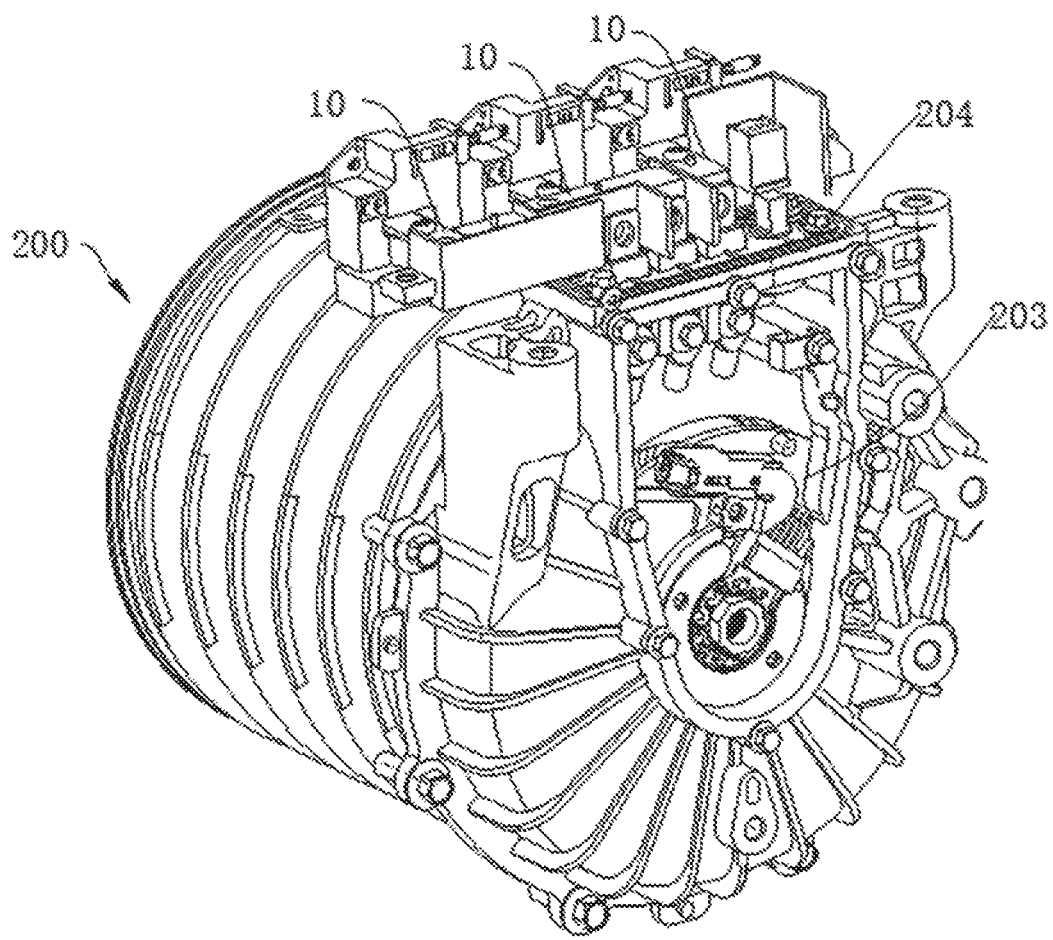
FIG. 13 is a schematic local structural diagram of an electric assembly according to another embodiment of the present disclosure.
Figure 14:
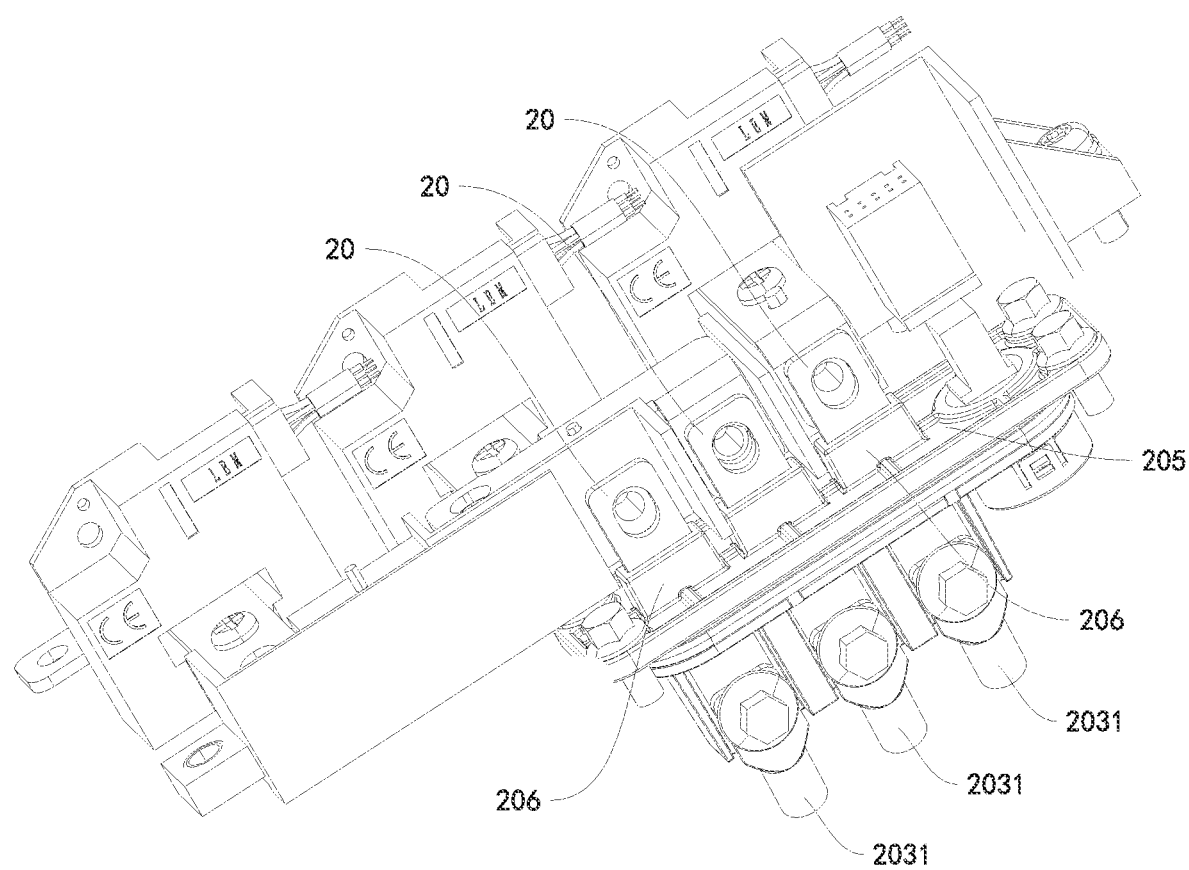
FIG. 14 is a schematic local structural diagram of an electric assembly according to another embodiment of the present disclosure.
Figure 15:
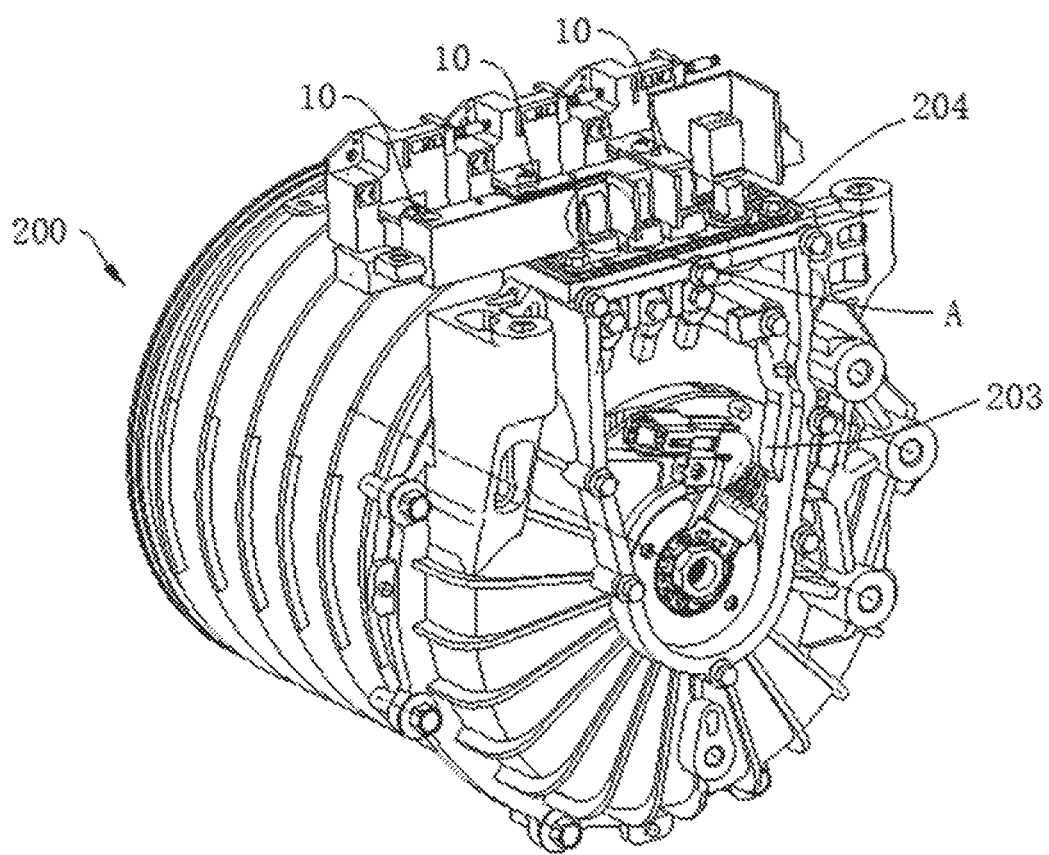
FIG. 15 is a schematic local structural diagram of an electric assembly according to another embodiment of the present disclosure.

According to an embodiment of the present disclosure, as shown in FIG. 13, the electric assembly 1 further includes a conductive sheet 20, where the conductive sheet 20 is configured to connect the controller 500 and the motor 200. For example, the conductive sheet 20 has a controller connection end and a motor connection end, the controller connection end is used for connecting to the controller 500, for example, connecting to a three-phase line of the controller 500, the motor connection end is used for connecting to the motor 200, for example, connecting to a three-phase line of the motor 200, and the conductive sheet 20 is fixed to the controller 500 through a bolt. In this way, external three-phase lines and connection bases may be left out, the length of the three-phase lines is reduced, the connection base structure is left out, and costs are reduced.

Specifically, the motor 200 includes a motor body 203 and a connection device 204, the connection device 204 is mounted on the motor body 203, the motor body 203 has a plurality of leading wires 2031, the connection device 204 includes a plurality of conductive sheets 20, and the plurality of conductive sheets 20 are respectively connected to the corresponding leading wires 2031, where the conductive sheet 20 has a controller connection end, and the controller connection end of the conductive sheet 20 is used for directly connecting to the controller 500.

In other words, the controller 500 is directly connected to the controller connection end at one end of the conductive sheet 20, and the other end of the conductive sheet 20 is connected to the leading wire 2031 of the motor body 203 (the leading wire may be a leading wire of a motor winding). In this way, the controller 500 may control the motor body 203, and the connection between the motor controller 100 and the motor body 203 through the conductive sheet 20 may make the entire structure of the motor 200 more compact.

In some embodiments, the connection device 204 further includes a supporting plate 205, the supporting plate 205 is relatively fixedly mounted on the motor body 203, the supporting plate 205 is provided with a positioning insert 206, two ends of the positioning insert 206 respectively stretch out of two opposite side surfaces on the supporting plate 205, a part of the conductive sheet 20 is inserted into the positioning insert 206, and the controller connection end of the conductive sheet 20 stretches out of the positioning insert 206. In other words, the supporting plate 205 is fixedly mounted on the motor body 203, the positioning insert 206 stretches out of two sides of the supporting plate 205, the conductive sheet 20 is inserted into the positioning insert 206, and two ends of the conductive sheet partially stretch out of the positioning insert 206 and are used for respectively connecting to the leading wire 2031 and the controller connection end, where the positioning insert 206 provides supporting and positioning for the conductive sheet 20.

Further, the plurality of conductive sheets 20 are disposed side by side and spaced apart from each other. It may be understood that, the plurality of conductive sheets 20 spaced apart from each other may prevent a case of short-circuit or confused connection from occurring.

That is to say, motor connection ends of conductive members 10 are connected to the conductive sheets 20 in a one-to-one correspondence, the conductive member 10 and the conductive sheet 20 are electrically connected, and the conductive member 10 and the conductive sheet 20 are directly connected without a conducting wire or another connection device. In this way, the line of the electric assembly 1 may be shortened, thereby improving the anti-interference capability, and greatly saving the space.

In an embodiment, the conductive member 10 and the conductive sheet 20 are in screw connection. The screw connection is self-locking connection, the connection is stable and not easy to be loose, and dismounting is convenient. Certainly, the foregoing embodiment is only schematic, and cannot be understood as a limitation on the protection scope of the present disclosure. For example, the conductive member 10 and the conductive sheet 20 may be in insertion connection, sticking connection, welding connection, riveting connection or the like.

Figure 16:
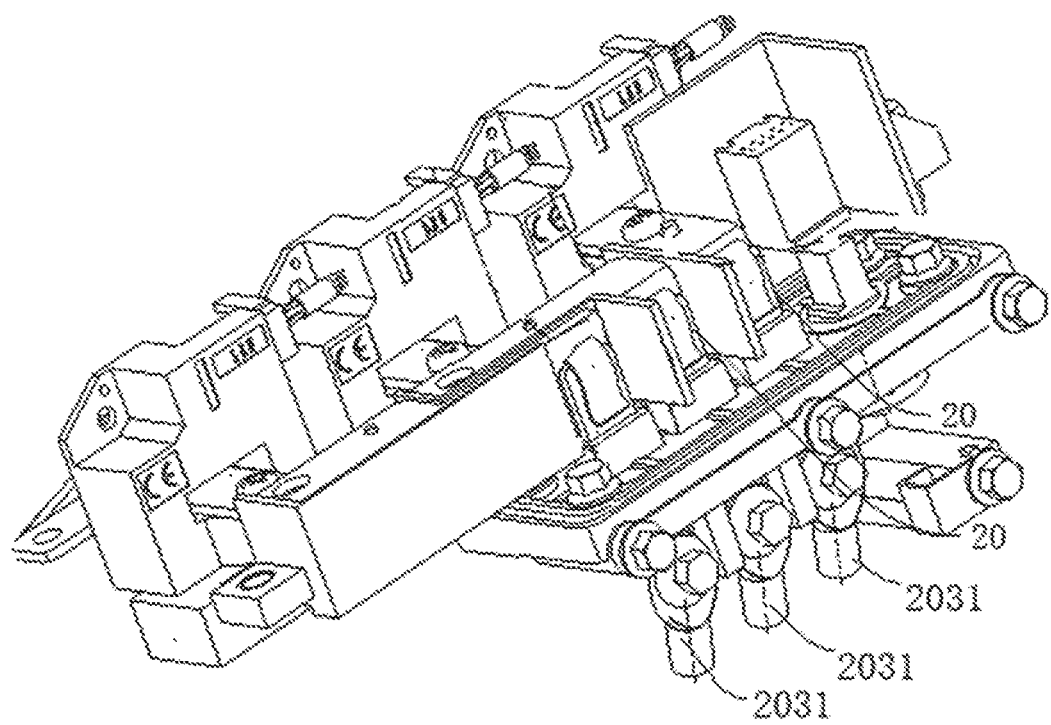
FIG. 16 is a schematic local structural diagram of an electric assembly according to another embodiment of the present disclosure.
Figure 17:
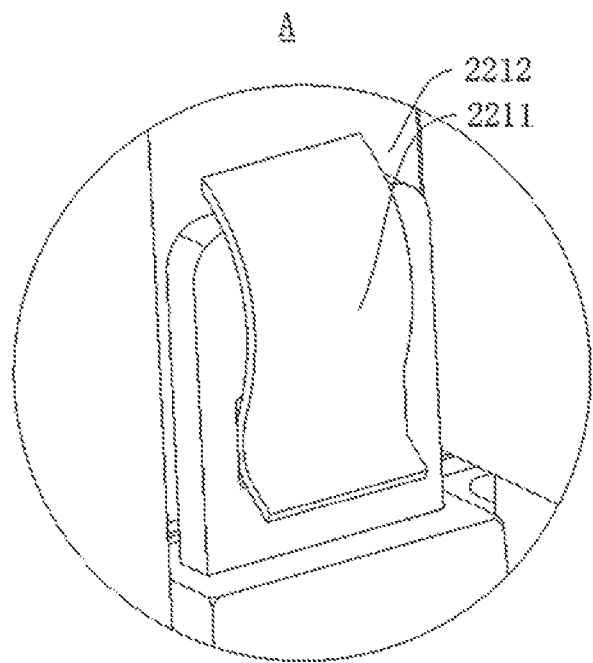
FIG. 17 is an enlarged diagram of a location A in FIG. 15.
Figure 18:
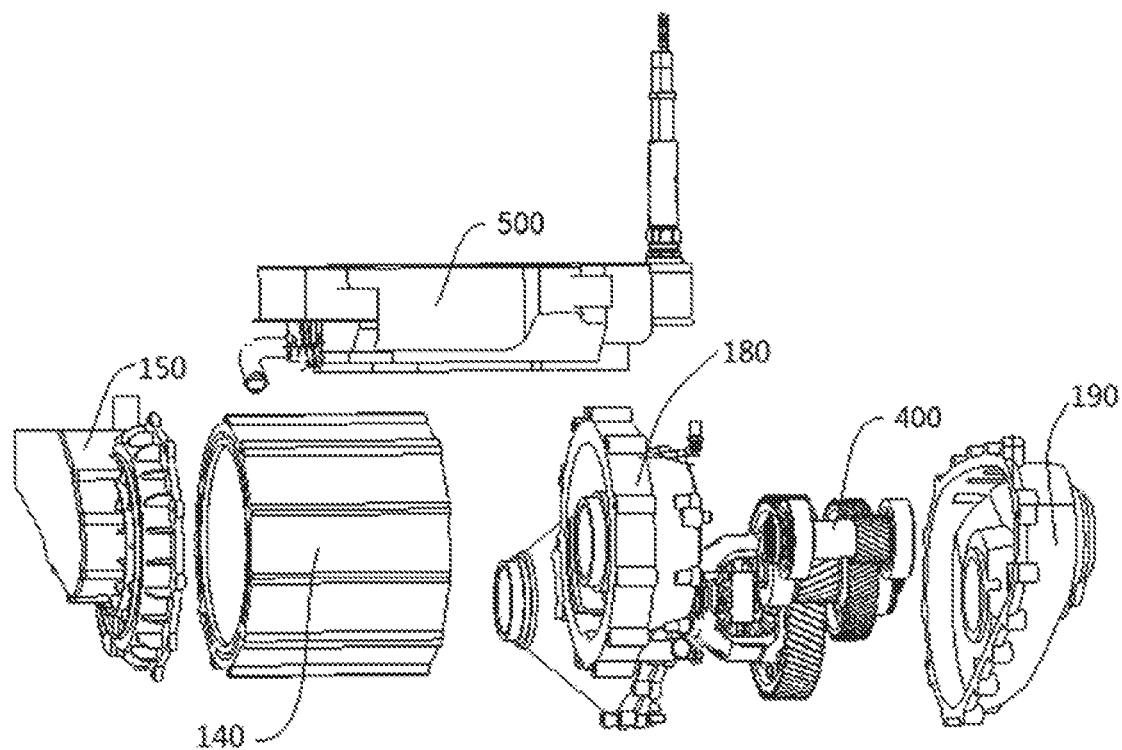
FIG. 18 is an exploded view of an electric assembly according to an embodiment of the present disclosure.

According to another embodiment of the present disclosure, as shown in FIG. 16, the electric assembly 1 further includes a conductive sheet 20, where the conductive sheet 20 is stuck in the controller 500 or the conductive sheet 20 is fixed to the controller 500 through a bolt. The conductive sheet 20 has a controller connection end and a motor connection end, the controller connection end is used for connecting to the controller 500, for example, connecting to a three-phase line of the controller 500, the motor connection end is used for connecting to the motor 200, for example, a three-phase line of the motor 200, and the conductive sheet 20 is stuck in the controller 500. In this way, dismounting and mounting of the conductive sheet 20 are facilitated, external three-phase lines and connection bases may be left out, the length of the three-phase lines is reduced, the connection base structure is left out, and costs are reduced.

Specifically, the electric assembly 1 includes a motor 200 and a controller 500. The motor 200 includes a motor body 203 and a connection device 204, the connection device 204 is mounted on the motor body 203, the motor body 203 has a plurality of leading wires 2031, the connection device 204 includes a plurality of conductive sheets 20, and the plurality of conductive sheets 20 are respectively connected to the corresponding leading wires 2031, where the conductive sheet 20 has a controller connection end. The motor controller 100 is mounted on the motor 200, the motor controller 100 has a conductive member 10, and the conductive member 10 has a power supply connection end used for connecting to a power supply and a motor connection end 2212 used for directly connecting to the motor 200, where one of the motor connection end 2212 of the conductive member 10 and the controller connection end of the conductive sheet has an insertion structure and the other one and the insertion structure are in insertion connection.

In other words, the power supply connection end of the conductive member 10 is connected to the power supply, and the motor connection end 2212 of the conductive member 10 and the controller connection end of the conductive sheet 20 are connected. That is to say, the motor controller 100 is directly connected to the controller connection end at one end of the conductive sheet 20, and the other end of the conductive sheet 20 is connected to the leading wire 2031 of the motor body 203 (the leading wire 2031 may be a leading wire of a motor winding). In this way, the motor controller 100 may control the motor body 203, and the connection between the motor controller 100 and the motor body 203 through the conductive sheet 20 may make the entire structure of the motor 200 more compact.

Moreover, the motor connection end 2212 of the conductive member 10 and the conductive sheet 20 of the motor 200 are connected through an insertion structure. It may be understood that, compared with an insulation line wiring manner, the insertion connection manner is simpler, procedures are simplified, and the time is saved. Moreover, when a bumping case is encountered, integrity of the conductive sheet 20 of the motor may be ensured, and occurrence of cases such as bending the conductive sheet 20 and breaking the conductive sheet 20 is reduced.

That is to say, motor connection ends 2212 of conductive members 10 are connected to the conductive sheets 20 in a one-to-one correspondence, the conductive member 10 and the conductive sheet 20 are electrically connected, and the conductive member 10 and the conductive sheet 20 are directly connected without a conducting wire or another connection device. In this way, the line of the electric assembly 1 may be shortened, thereby improving the anti-interference capability, and greatly saving the space.

In some embodiments, the conductive sheet 20 is provided with a stop groove, the insertion structure is provided with a stop protrusion, and the stop protrusion is properly buckled into the stop groove. When the insertion structure and the conductive sheet 20 are connected, the stop protrusion matches the stop groove. In this way, the contact area between an insertion sheet 2211 and the conductive sheet 20 may be increased, and the insertion sheet 2211 may be prevented from transiently departing from the conductive sheet 20 during vibration, to prevent a case of undesired contact from occurring.

A vehicle 11 according to an embodiment of the present disclosure is described below. The vehicle 11 according to one embodiment of the present disclosure includes the electric assembly 1 according to the foregoing embodiment of the present disclosure.

In the vehicle 11 according to one embodiment of the present disclosure, the electric assembly 1 according to one embodiment of the present disclosure is used, where the electric assembly has advantages such as a compact structure and a good cooling effect.

Other configurations and operations of the vehicle 11 according to the embodiments of the present disclosure are known to those of ordinary skill in the art and will not be described in detail herein.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure. Moreover, features modified by "first" and "second" may explicitly or implicitly include one or more features. In descriptions of the present disclosure, "a plurality of" means two or more, unless otherwise stated.

In the descriptions of the present disclosure, it should be noted that, unless otherwise clearly specified and defined, terms such as "mounting", "interconnection", and "connection" shall be understood in a broad sense, for example, may be a fixing connection, a detachable connection, an integral connection, a mechanical connection, an electrical connection, a direct connection, an indirect connection by using an intermediate medium, and communication between interiors of two components. A person of ordinary skill in the art may understand specific meanings of the foregoing terms in the present disclosure according to a specific situation.

In the descriptions of this specification, descriptions such as reference terms "an embodiment", "some embodiments", "exemplary embodiment", "example", "specific example", or "some examples" indicate that specific features, structures, materials, or characteristics described with reference to embodiments or examples are included in at least one embodiment or example of the present disclosure. In this specification, exemplary descriptions of the foregoing terms do not necessarily refer to a same embodiment or example. In addition, the described specific feature, structure, material, or characteristic may be combined in a proper manner in any one or more embodiments or examples.

Although the disclosed embodiments of the present disclosure have been shown and described, a person skilled in the art can understand that the above embodiments cannot be construed to limit the present disclosure, and changes, alternatives, and modifications can be made in the embodiments without departing from the principle and the purpose of the present disclosure.

What is claimed is:
1. An electric assembly, comprising:
  a box assembly, wherein a mounting plate is disposed in the box assembly, and the mounting plate divides a space within the box assembly into a motor holding cavity and a transmission holding cavity;
a motor, wherein the motor is disposed in the motor holding cavity and comprises a motor shaft; and
a transmission, wherein the transmission is disposed in the transmission holding cavity, the transmission comprises a main shaft and a differential assembly, an axis of the main shaft is offset from and parallel to an axis of the differential assembly, the motor is power-coupled to the transmission through the motor shaft coupling with the main shaft at an overlapping region of the motor shaft and the main shaft, a bearing is disposed at the overlapping region, and the motor and the transmission are directly integrated through the box assembly without external connection of the motor and the transmission,
wherein the mounting plate is a monolithically integral part of the box assembly.

2. The electric assembly according to claim 1, wherein the transmission holding cavity is configured to contain a cooling lubricating liquid to cool the box assembly, and
the cooling lubricating liquid cools the box assembly through the mounting plate.

3. The electric assembly according to claim 1, wherein a distance between the motor and the mounting plate is less than a preset distance such that the mounting plate cools the motor.

4. The electric assembly according to claim 1, wherein at least one of a surface of the mounting plate facing the motor and a surface of the mounting plate facing the transmission is provided with ribs, and
the ribs divide a space between the mounting plate and the motor into a plurality of cavities.

5. The electric assembly according to claim 4, wherein the ribs comprise an annular rib extending along a circumferential direction of the motor.

6. The electric assembly according to claim 4, wherein the ribs comprise a plurality of strip-shaped ribs extending along a radial direction of the motor, and the strip-shaped ribs are spaced apart along a circumferential direction of the mounting plate, and
heights of at least a part of the strip-shaped ribs relative to the mounting plate gradually decrease from a center portion of the mounting plate to a periphery portion of the mounting plate.

7. The electric assembly according to claim 1, wherein the box assembly comprises a transmission box and a motor box,
the transmission box comprises a front box and a rear box,
the motor box comprises a motor housing and a motor backend cover,
the front box and the motor housing are disposed adjacent to each other, and
the mounting plate is a part of the front box or a part of the motor housing.

8. The electric assembly according to claim 1, wherein:
the box assembly comprises a transmission box and a motor box,
the transmission box comprises a front box and a rear box,
the motor box comprises a motor frontend cover, a motor housing, and a motor backend cover, and
the mounting plate is a part of the front box or a part of the motor frontend cover.

9. An electric assembly, comprising:
a box assembly, wherein a mounting plate is disposed in the box assembly, and the mounting plate divides a space within the box assembly into a motor holding cavity and a transmission holding cavity;
a motor, wherein the motor is disposed in the motor holding cavity and comprises a motor shaft;
a transmission, wherein the transmission is disposed in the transmission holding cavity, the transmission comprises a main shaft and a differential assembly, an axis of the main shaft is offset from and parallel to an axis of the differential assembly, and the motor is power-coupled to the transmission through the motor shaft coupling with the main shaft at an overlapping region of the motor shaft and the main shaft, a bearing is disposed at the overlapping region; and
a conductive sheet and a controller,
wherein:
the box assembly comprises a transmission box and a motor box,
the transmission box comprises a front box and a rear box,
the motor box comprises a motor housing and a motor backend cover,
the front box and the motor housing are disposed adjacent to each other,
the mounting plate is a part of the front box or a part of the motor housing, and
the conductive sheet connects to the controller and the motor.

10. The electric assembly according to claim 9, wherein the controller is mounted outside the box assembly and fixedly connected to the box assembly.

11. A vehicle comprising an electric assembly, wherein the electric assembly comprises:
a box assembly, wherein a mounting plate is disposed in the box assembly, and the mounting plate divides a space within the box assembly into a motor holding cavity and a transmission holding cavity;
a motor, wherein the motor is disposed in the motor holding cavity and comprises a motor shaft; and
a transmission, wherein the transmission is disposed in the transmission holding cavity, the transmission comprises a main shaft and a differential assembly, an axis of the main shaft is offset from and parallel to an axis of the differential assembly, the motor is power-coupled to the transmission through the motor shaft coupling with the main shaft at an overlapping region of the motor shaft and the main shaft, a bearing is disposed at the overlapping region,, and the motor and the transmission are directly integrated through the box assembly without external connection of the motor and the transmission,
wherein the mounting plate is a monolithically integral part of the box assembly.

12. The vehicle according to claim 11, wherein
the transmission holding cavity is configured to contain a cooling lubricating liquid to cool the box assembly,
the cooling lubricating liquid cools the box assembly through the mounting plate.

13. The vehicle according to claim 11, wherein a distance between the motor and the mounting plate is less than a preset distance such that the mounting plate cools the motor.

14. The vehicle according to claim 11, wherein
at least one of a surface of the mounting plate facing the motor and a surface of the mounting plate facing the transmission is provided with ribs, and
the ribs divide a space between the mounting plate and the motor into a plurality of cavities.

15. The vehicle according to claim 14, wherein the ribs comprise an annular rib extending along a circumferential direction of the motor.

16. The vehicle according to claim 14, wherein
the ribs comprise a plurality of strip-shaped ribs extending along a radial direction of the motor, and the strip-shaped ribs are spaced apart along a circumferential direction of the mounting plate, and
heights of at least a part of the strip-shaped ribs relative to the mounting plate gradually decrease from a center portion of the mounting plate to a periphery portion of the mounting plate.

17. The vehicle according to claim 11, wherein
the box assembly comprises a transmission box and a motor box,
the transmission box comprises a front box and a rear box,
the motor box comprises a motor frontend cover, a motor housing and a motor backend cover, and
the mounting plate is a part of the front box or a part of the motor frontend cover.

18. The vehicle according to claim 11, wherein
the box assembly comprises a transmission box and a motor box,
the transmission box comprises a front box and a rear box,
the motor box comprises a motor housing and a motor backend cover,
the front box and the motor housing are disposed adjacent to each other, and
the mounting plate is a part of the front box or a part of the motor housing.

19. The vehicle according to claim 18, wherein the electric assembly further comprises a conductive sheet and a controller, and the conductive sheet connects the controller with the motor.

20. The vehicle according to claim 19, wherein the controller is mounted outside the box assembly and fixedly connected to the box assembly.

* * * * *